US012611348B2

(12) United States Patent
Jönsson et al.

(10) Patent No.: US 12,611,348 B2
(45) Date of Patent: Apr. 28, 2026

(54) PATIENT TRANSFER DEVICE

(71) Applicant: Arjo IP Holding Aktiebolag, Malmö (SE)

(72) Inventors: Jörgen Jönsson, Harlösa (SE); Mathieu Nadeau, Compton (CA); Anders Lundquist, Genarp (SE); Alexandre Girard, Sherbrooke (CA); Philippe-Olivier Provost, Sherbrooke (CA); Donatien Callon De Monet De Lamarck, Paris (FR)

(73) Assignee: Arjo IP Holding Aktiebolag, Malmö (SE)

(*) Notice: Subject to any disclaimer, the term of this patent is extended or adjusted under 35 U.S.C. 154(b) by 325 days.

(21) Appl. No.: 18/285,791

(22) PCT Filed: Apr. 1, 2022

(86) PCT No.: PCT/SE2022/050327
§ 371 (c)(1),
(2) Date: Oct. 5, 2023

(87) PCT Pub. No.: WO2022/216201
PCT Pub. Date: Oct. 13, 2022

(65) Prior Publication Data

US 2024/0366451 A1 Nov. 7, 2024

(30) Foreign Application Priority Data

Apr. 9, 2021 (SE) .................................... 2150445-1
Jul. 15, 2021 (SE) .................................... 2150950-0

(51) Int. Cl.
*A61G 7/10* (2006.01)

(52) U.S. Cl.
CPC ......... *A61G 7/1048* (2013.01); *A61G 7/1051* (2013.01); *A61G 2200/32* (2013.01);
(Continued)

(58) Field of Classification Search
CPC ... A61G 7/1017; A61G 7/1046; A61G 7/1048
(Continued)

(56) References Cited

U.S. PATENT DOCUMENTS 5,348,326 A * 9/1994 Fullenkamp ........... A61G 1/042 280/43
5,937,959 A * 8/1999 Fujii .................... A61G 7/1096 180/12
(Continued)

FOREIGN PATENT DOCUMENTS

AU 2021102659 A4 * 7/2021 ........... A61G 7/1051
EP 1 911 429 A2 4/2008
(Continued)

OTHER PUBLICATIONS

International Search Report and Written Opinion dated Aug. 11, 2022, issued in corresponding International Patent Application No. PCT/SE2022/050327.
(Continued)

*Primary Examiner* — Eric J Kurilla
(74) *Attorney, Agent, or Firm* — Morgan, Lewis & Bockius LLP

(57) ABSTRACT

A patient transfer device (10) and a method of controlling the patient transfer device is provided. The patient transfer device (10) comprises a chassis (100) having a plurality of wheels (110) and a vertically extending support structure (200). The patient transfer device (10) further comprises one motorized wheel (210).

16 Claims, 8 Drawing Sheets

(52) U.S. Cl.
CPC ...... *A61G 2203/32* (2013.01); *A61G 2203/34* (2013.01); *A61G 2203/42* (2013.01)

(58) Field of Classification Search
USPC .............................................................. 5/87.1
See application file for complete search history.

(56) References Cited

U.S. PATENT DOCUMENTS

| | | | | |
|---|---|---|---|---|
| 6,598,247 | B1 * | 7/2003 | Heimbrock .......... | A61G 1/0287 296/20 |
| 10,123,921 | B2 * | 11/2018 | Paul ..................... | A61G 7/1048 |
| 2003/0159861 | A1 * | 8/2003 | Hopper ................ | A61G 1/0268 180/22 |
| 2007/0067905 | A1 | 3/2007 | Wilder | |
| 2010/0181122 | A1 * | 7/2010 | Block ...................... | A61G 7/08 180/15 |
| 2011/0277235 | A1 * | 11/2011 | Okumatsu ............ | A61G 7/1017 5/83.1 |
| 2011/0277241 | A1 * | 11/2011 | Schejbal ................ | A61G 7/018 5/510 |
| 2012/0198620 | A1 * | 8/2012 | Hornbach ............ | A61G 7/0524 5/510 |
| 2017/0020755 | A1 * | 1/2017 | Paul ....................... | B62D 61/12 |
| 2021/0196548 | A1 * | 7/2021 | Derenne .............. | A61G 7/0506 |
| 2021/0330524 | A1 * | 10/2021 | Chien .................. | A61G 7/1048 |

FOREIGN PATENT DOCUMENTS

| | | | | |
|---|---|---|---|---|
| EP | 2 208 487 | A2 | 7/2010 | |
| EP | 3 069 957 | A1 | 9/2016 | |
| GB | 2415182 | A * | 12/2005 | .......... A61G 7/1051 |
| WO | 02/074216 | A2 | 9/2002 | |
| WO | 2009/136359 | A1 | 11/2009 | |
| WO | WO-2012096570 | A1 * | 7/2012 | .......... B66F 9/07568 |

OTHER PUBLICATIONS

Office Action with Search Report issued on Nov. 11, 2025 in European Patent Application No. 22716573.5.

* cited by examiner

PATIENT TRANSFER DEVICE

TECHNICAL FIELD

The present invention relates to a patient transfer device. In particular, the present invention relates to a patient transfer device configured to provide motorized assistance for patient transfer, and systems and methods thereof.

BACKGROUND

Transport of patients is a common task in medical care facilities. Manually operated transport systems are generally designed to be easy to use, controllable and responsive. However, balancing these desires in a particular environment is often challenging.

It has been realized that manual handling of patients exposes care givers to dangerously high strains, especially in their lower backs, resulting in possible injuries. For this reason, patient handling equipment for the transfer of a patient from one location to another has been developed. These vary, for example, from wheeled beds and trolleys to mobile slings and hoists, mobility frames and similar devices. Equipment such as this is now used in the day to day work in a multitude of settings including hospitals, care homes and personal residences. Proper use of such equipment can significantly lower the risk for injury to the care giver and also the risk of slips, falls, strains and knocks to the patient. However, the introduction of such equipment is not without its issues. It is well known for manual hospital beds and the like to be heavy, difficult to start moving or stop, difficult to direct and have "minds of their own", despite the best efforts of its operator pushing in the desired direction. Additionally, equipment that may be useful in a hospital environment may not be suitable for use in a residential environment, for example, meaning that different equipment may be needed in different environments despite being used for the same or similar purpose.

Powered or power assisted patient transfer devices have been developed, both in the form of systems built-in to the chassis of the equipment, for example a bed frame, stretcher, hoist or the like and as devices to be added to an existing chassis. While generally helpful, such systems are so far associated with a number of drawbacks relating to manoeuvrability. Also other factors such as soft floors, a desire for smaller wheels, and heavier patients all contribute to further limitations of the usability of prior art patient transfer devices.

To give some examples, a floor lift typically is provided with four swivelling wheels arranged at the corners of the floor lift. One prior art floor lift providing motorized assistance is equipped with two motorized wheels at the rear end. The motorized wheels in such a floor lift replaces the rear swivelling wheels. This requires the floor lift to turn around the rear wheels thus resulting in a relatively large turning radius. Yet further such solution is both costly and power demanding, as two motorized swivelling mechanism are required.

An attempt that seeks to provide improvements to the above-mentioned prior art floor lift is based on the concept of having one big motorized swivelling wheel at the rear end, i.e. close to the rear swivelling wheels. One big disadvantage with such solution, in addition to cost and significant energy consumption, is reduced manoeuvrability. The floor lift with the motorized wheel at the rear end tends to turn around the patient, and it is very difficult to move the patient sideways, resulting in a user experience of only being able to turn around the patient and not moving the patient freely.

In light of the above, there is a need for a patient transfer device that allows for motorized assistance while providing improved manoeuvrability.

SUMMARY

An object of the present invention is thus to provide a solution which reduces the effort required by the user to move the patient transfer device freely. Especially, an object is to reduce patient swinging during transport and to improve usability and ergonomics of patient transport.

According to a first aspect, a patient transfer device is provided. The patient transfer device comprises a chassis having a plurality of wheels, and a vertically extending support structure. The patient transfer device further comprises one supporting wheel.

The chassis comprises a base. The base is arranged in a horizontal plane extending perpendicular to the support structure. A first and second front wheel of the plurality of wheels are mounted to the base at a horizontal distance from each other. A first and second back wheel are mounted to the base at a horizontal distance from each other and the first and second front wheel. The horizontal distances define a support area in the horizontal plane. The supporting wheel is mounted to the chassis and is arranged in a position in the horizontal plane disposed within the support area.

As will be described in further detail in the detailed description, the positioning of the supporting wheel is associated with a number advantages in terms of patient comfort and manoeuvrability.

The supporting wheel may be a motorized wheel. The patient transfer device has proven to allow for motorized assistance being safe and efficient, causing comparatively low energy consumption, and which can be produced with low cost and high reliability.

Further, the positioning of the motorized wheel allows for moving of a patient towards the head or foot end of a bed by rotating the patient transfer device, thus an omni-directional drive does not have to be used. Thus additional cost and complexity of the transfer device is avoided.

In an embodiment, the vertically extending support structure extends along a vertical centreline. The vertical centreline intersects the horizontal plane in a support point. The first and second front wheel and the support point defines a support zone in the horizontal plane within the support area. The supporting wheel is arranged in a position in the horizontal plane disposed within the support zone.

Such a patient transfer device is advantageous in that it assists in manoeuvring the patient for turning and for starting movement. As only one supporting wheel is installed in a strategic location, it is possible to reduce the required starting force and assist in going straight when there is a patient carried by the device. The patient transfer device also helps rotation by adding a pivot point judiciously positioned so the control and the turning becomes natural for the user operating and driving the patient transfer device.

In an embodiment, the base extends along a horizontal centreline. The supporting wheel is aligned with the horizontal centreline.

This allows for desirable turning properties while using a single supporting wheel.

Preferably, the supporting wheel may be arranged adjacent to the support point to facilitate turning of the patient transfer device.

In an embodiment, the base comprises a pair of horizontal bars. The horizontal bars may extend in the horizontal plane. Each horizontal bar of the pair may be provided with one front wheels. The supporting wheel may be arranged between the horizontal bars.

In an embodiment, the vertically extending support structure is provided with a patient support for supporting the weight of a patient. The patient support is provided with patient attachment means.

The patient attachment means are arranged on the patient support at a mounting point. A vertical support axis extends through the mounting point and intersects the horizontal plane in a point disposed in a portion of the horizontal plane extending between the supporting wheel and the first and second front wheel.

Thus, the centre of gravity of the patient may be held between the supporting wheel and front wheels of the patient transfer device. This increases the manoeuvrability of the patient transfer device even when a patient is supported by the patient support.

The patient attachment means may be arranged to receive a patient sling to be worn by the patient, i.e. the patient supported by the patient support.

In an embodiment, the supporting wheel is a non-swivel wheel. This reduces complexity of the patient transfer device, still providing the desired improvements in manoeuvrability.

The supporting wheel may be actuatable between an idle position where the supporting wheel is elevated from the ground and an operational position where the supporting wheel is in contact with the ground. Thus, the supporting wheel may be moved out of engagement with the ground to accommodate manoeuvring of the patient transfer device.

The patient transfer device may further comprise actuating means operatively connected to the supporting wheel for actuating the supporting wheel between the idle and operational position.

The actuating means may comprise at least one actuating element. The actuating element is operable by a user for actuating the supporting wheel between the idle and operational position.

The actuating element is arranged to form a foot pedal or foot switch of the patient transfer device.

In an embodiment, the supporting wheel is a non-driven wheel.

In an embodiment, the supporting wheel is a motorized wheel.

The motorized wheel may be provided with a hub motor. A very compact solution is thereby provided.

The supporting wheel may be mounted to the chassis by means of a transmission. This allows for additional functionality of the patient transfer device.

The transmission may e.g. be controllable to cause a vertical motion of the supporting wheel between an idle position, where the supporting wheel is elevated from the ground, and an operational position, where the supporting wheel is in contact with the ground. This allows for significant power savings in case of the patient transfer device having propulsion means, as the wheel will only be in the operational position when actually required.

In an embodiment, the transmission is controllable to cause a vertical motion of the motorized wheel between an idle position where the motorized wheel is elevated from the ground and an operational position where the motorized wheel is in driving contact with the ground.

The transmission may comprise a motor and a lead screw driven by said motor. This provides for efficient and accurate control of the position of the wheel.

The support structure may be provided with a handle for manoeuvring the patient transfer device and a patient support.

In an embodiment, the support structure may have a rear side being provided with a handle for manoeuvring the patient transfer device, and a front side being provided with a patient support.

The handle may be provided with at least one sensor for determining a grip of a user. Control of the patient transfer device is thereby possible from the sensor signal, which allows for a very user friendly on/off procedure.

The handle may be provided with means for determining user activation of the patient transfer device. Preferably, the means is a detector of a thumb grip and it may be a pressure sensor, a switch, a push button, or similar.

The handle may further be provided with a force sensor configured to measure the force applied to the patient transfer device by a user. By determining the force in real time, control of the motorized wheel may be further improved and adaptive, as the determined force may be used as an input when controlling the speed of the motorized wheel.

The patient transfer device may further comprise a controller connected to the motorized wheel and being configured to control the operation of the motorized wheel. Automatic control of the patient transfer device is thereby enabled.

The controller may further be connected to the transmission motor and being configured to control the operation of the transmission motor. Automatic activation and deactivation of the motorized wheel is thereby provided.

The controller may be configured to determine control signals to the motorized wheel and/or to the transmission motor based on current operational properties of the patient transfer device. Hence, the patient transfer device can be controlled based on real time parameters, allowing improved operation.

The control signal to the transmission motor may be determined based on the current payload and/or the presence of a user gripping the patient transfer device. A lifting mechanism may for this purpose be provided in the patient transfer device to allow deactivating of the motorized assistance when no patients are present, since it is most often not useful to have it during that phase. Also, it is thus possible to allow deactivating for some manoeuver like pure sideways movement in which case the pivot point is less useful, and due to the fact that motorized assistance could even block some degrees of freedom.

In an embodiment, the presence of a user gripping the patient transfer device is determined by means of a sensor using surface acoustic wave detection.

In an embodiment, the control signal to the motorized wheel may be determined based on the force applied to the patient transfer device by a user. Preferably, the controller is configured to measure the handle force applied by a user as well as the actual speed of the motorized wheel, and to use these inputs to control the motorized wheel speed.

According to a second aspect, a controller is provided. The controlled is configured to form part of a patient transfer device having one motorized wheel. The controller is further configured to determine a force applied to the associated patient transfer device by a user, to determine a control signal based on the determined force, and to transmit the control signal to the motorized wheel.

In an embodiment, the controller is further configured to determine the control signal based on data from the motorized wheel.

In an embodiment, the controller is further configured to determine the control signal based on an admittance controller.

In an embodiment, the controller is further configured to determine the control signal based on a variable admittance controller.

The controller may be further configured to determine a current payload of the associated patient transfer device as well as if a user is gripping the patient transfer device, to determine a control signal based on user grip, and to transmit the control signal to a transmission motor connected to the motorized wheel.

According to a third aspect, a method for a patient transfer device is provided. The method comprises controlling the speed of the motorized wheel based on a determined force applied by a user to the patient transfer device.

In an embodiment, the method further comprises, before the controlling of the speed, i) determining initiation of the patient transfer device, ii) determining activation of the patient transfer device, and iii) controlling operation of the patient transfer device by arranging a motorized wheel in an operational position, where the motorized wheel is in driving contact with the ground.

Determining initiation of the patient transfer device may comprise determining that a current payload is above a threshold weight value, and/or determining that a current power level of an associated battery is above a threshold value and/or determining that a tilt sensor is under a threshold tilt angle.

Determining activation of the patient transfer device may comprise determining that a user is gripping the patient transfer device, and that the user has manually requested activation while gripping the patient transfer device.

Controlling of the speed of the motorized wheel based on the determined force applied by a user to the patient transfer device may be such that the user perceives a weight of the payload to be that of a comfort weight.

Controlling of the speed of the motorized wheel based on the determined force applied by a user to the patient transfer device may further comprise an admittance controller and/or a variable admittance controller.

Determining of a grip of a user may be performed by means of a sensor using surface acoustic wave detection.

According to an aspect, a patient transfer device is provided. The patient transfer device comprises a chassis having a plurality of wheels and a vertically extending support structure is provided. The patient transfer device may comprise at least one motorized wheel and may be provided with handle. The handle may be provided with at least one sensor for determining a grip of a user. The patient transfer device may comprise a controller operatively connected to the motorized wheel and the sensor, whereby the controller is configured to control the operation of the motorized wheel in response to input from the sensor. The patient transfer device may be a patient transfer device according to any one of the above embodiments, the controller may be a controller according to any of the above embodiments. The controller may be configured to perform the method according to any of the above embodiments.

According to an aspect, a patient transfer device is provided. The patient transfer device has a plurality of wheels and a vertically extending support structure. The patient transfer device further comprises a supporting wheel. The chassis comprises a base arranged in a horizontal plane extending perpendicular to the support structure.

The supporting wheel is actuatable between an idle position where the supporting wheel is elevated from the ground an operational position where the supporting wheel is elevated from the ground and an operational position where the supporting wheel is in contact with the ground.

The patient transfer device further comprises actuating means operatively connected to the supporting wheel for actuating the supporting wheel between the idle and operational position.

The actuating means may comprise at least one actuating element operable by a user for actuating the supporting wheel between the idle and operational position.

At least one of said at least one actuating element may be a hand- and/or voice operated element.

At least one of said at least one actuating element may be arranged to form a foot pedal or foot switch.

The actuating element may comprise at least one actuation portion operable by a user for actuating the supporting wheel.

The base of patient transfer device may extend along a horizontal centreline.

At least one actuation portion may be arranged at horizontal distance from the horizontal centreline in a direction substantially perpendicular to the horizontal centreline. Preferably, actuation of said actuation portion causes actuation of the supporting wheel to the idle position.

The actuation portion may extend in a direction substantially perpendicular to the horizontal centreline and may have an outer edge surface operable by the user. The outer surface may be inclined relative a horizontal plane and facing outwardly from horizontal centreline.

At least one actuation portion may be arranged proximal to the horizontal centreline such that said protruding actuation portion is accessible from a side of the patient transfer device extending substantially perpendicular to the horizontal centreline. Advantageously, actuation of said actuation portion causes actuation of the supporting wheel to the idle position. Said actuation portion may extend in a direction substantially parallel to the horizontal centreline and have an outer edge surface operable by the user. The outer surface may be inclined relative a horizontal plane and the horizontal centreline may extend through a plane formed by said outer edge surface.

In one embodiment, the actuation element may comprise a plurality of actuation portions.

In one embodiment, the actuation element may be arranged at the base.

In one embodiment, the actuation element may be extend across the entire width of the base of the patient transfer device.

In one embodiment, the supporting wheel may be mounted to the chassis by means of a transmission. The transmission may be controllable to cause a vertical motion of the supporting wheel between the idle position and operational position.

The transmission may comprise a transmission motor. The controller may be operatively connected to the transmission motor for controlling the actuation of the supporting wheel.

The supporting wheel may be mounted to the chassis by means of a biasing device. The biasing device may be arranged to provide a biasing force towards the ground when the supporting wheel is in the operational position.

BRIEF DESCRIPTION OF THE DRAWINGS

The invention will be described with reference to the accompanying drawings, in which.

DETAILED DESCRIPTION

The invention has been described above in detail with reference to embodiments thereof. However, as is readily understood by those skilled in the art, other embodiments are equally possible within the scope of the present invention, as defined by the appended claims.

Figure 1:
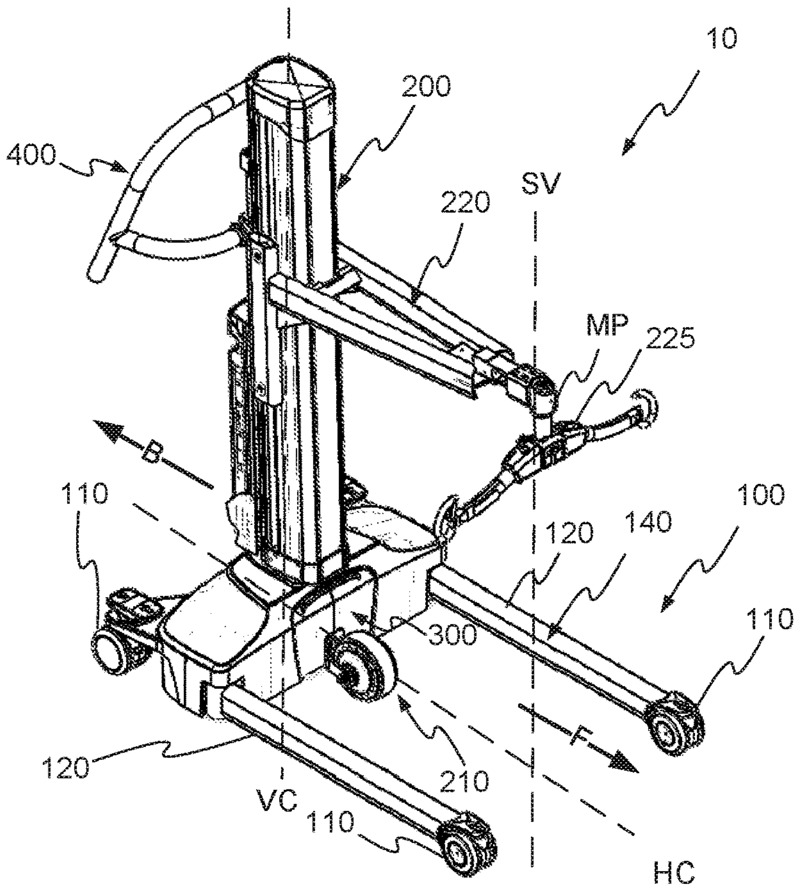
FIG. 1*a* is an isometric view of a patient transfer device according to an embodiment.

FIG. 1 illustrates an isometric view of a patient transfer device 10 according to an embodiment of the present invention. In the shown example the patient transfer device 10 is a floor lifter, however the solution presented herein is applicable also for other types of patient transfer devices such as, but not limited to, wheeled trolleys, mobile hoists, mobility frames, shower chairs, bariatric commode chairs wheeled chair etc. The patient support device comprises a chassis 100, typically, as shown in FIG. 1, the chassis 100 comprises a base 140. The base 140 may be arranged in a horizontal plane extending perpendicular to the support structure 200.

The vertically extending support structure 200 may comprise one or more columns extending from the base 140. The vertically extending may extend along a vertical centreline VC. In an embodiment, wherein the vertically extending support structure comprises a plurality of columns, the vertical centreline VC may be considered a common vertical centreline for said columns.

The base 140 may comprise two or more horizontal bars 120. The horizontal bars 120 may, as shown in FIG. 1, be substantially parallel but may very well be V-shaped or any other suitable shape or form. Preferably, the chassis 100 is formed with an open end towards a front direction F in order to ease the pickup and drop-off of a patient or any other payload. The horizontal bars may extend in the above referenced horizontal plane in which the base 140 extends.

The chassis 100 is provided with a plurality of wheels 110 for moving of the patient transfer device 10 along the ground. These wheels 110 are preferably arranged at ends of the horizontal bars 110, i.e. at the respective corners of the chassis 100, in order to provide a stable patient support device 10 also when heavy payloads are being lifted. Preferably all the wheels 110 at the ends of the horizontal bars 110 are swivel wheels 110, this in order to increase the mobility of the patient transfer device 10 by e.g. allowing it to turn smoothly both when moving in the forward direction F and in a backwards direction B, as well as in any direction there between.

It should be mentioned that there are several constraints put on the wheels 110. The use of soft floors is getting more popular. Soft floors are quiet and good to walk on, but they make it difficult to manoeuver small wheels 110 across the floor, especially when transporting heavy patients, and patients are becoming heavier. Further to this, it is commonly requested that the wheels 110 are to be kept as small as possible in order for the horizontal bars 120 of the patient transfer device 10 to fit under beds and other furniture.

The front wheels of the plurality of wheels may be provided on the horizontal bars 120.

The patient transfer device 10 is provided with a vertically extending support structure 200. The vertically extending support structure 200, or support structure 200 for short, extends vertically from the chassis 100 of the patient transfer device 10. The vertically extending support structure 200 is typically provided with a patient support 220 arranged to extend in the forward direction F of the patient transfer device 10. The patient support 220 is provided with a patient attachment means 225 for supporting a patient. In order to ensure that the patient transfer device 10 is stable also when transporting heavier payloads by means of the patient attachment means 225, the support structure 200 is preferably mounted substantially centrally between the horizontal bars 120 and offset in the backwards direction B of the chassis. Such an arrangement of the support structure 200 reduces the risk of the patient transfer device 10 tipping over when transporting heavy payloads.

The patient attachment means 225 are arranged on the patient support 200 at a mounting point MP. The mounting point may be in the form of a mechanical connection between said patient attachment means and the patient support. In the depicted example the patient attachment means 225 is in the form of a spreader bar for receiving a patient sling. The mounting point MP may thus be considered the coupling between said spreader bar and the patient support 220. A vertical support axis SV extends through the mounting point MP and intersects the horizontal plane.

The support structure has a handle 400 for allowing for manoeuvring of the patient transfer device.

Preferably, the handle 400 is arranged at the rear side of the support structure 200, in order for a care giver, or user, to easily manoeuvre the patient transfer device 10.

The details given this far regarding the patient transfer device 10 are typically present at a generic patient transfer device and there are, as mentioned earlier, limitations in these devices. Typically, prior art patient transfer devices have four swivelling wheels. This allows going in all directions, but makes it hard to change direction and to keep driving straight. Further to this, if some of the wheels are motorized, typically these are not swivelling and a user 20 or caregiver 20 need to turn around the motorized wheels producing a very large turning radius which makes is difficult to manoeuver a prior art patient transfer device in a smaller room with e.g. a hospital bed and medical equipment.

In order to reduce the effort required by the user 20 to move around with the patient transfer device 10, to reduce patient swinging during transportation, and to improve usability and ergonomics of moving around with the patient transfer device 10 while transferring or transporting a patient, the patient transfer device comprises one supporting wheel 210. The supporting wheel 210 is mounted to the chassis 100, preferably towards the forward direction F of the patient transfer device 10. The supporting wheel 210 is located substantially centrally between the horizontal bars 120 and offset along the forward/backward extension of the horizontal bars 120. This means that the supporting wheel 210 is located such that it is between front wheels 110 and rear wheels 110, along the horizontal bars 120, of the patient transfer device 10. Front wheels 110 are to be understood as the wheels 110 located at, in the forward direction F, the front end of the patient transfer device 10. Correspondingly, the rear wheels 110 are to be understood as the wheels located at, in the forward direction F, the rear end of the patient transfer device 10.

Preferably, the wheel is a non omni-directional wheel to avoid complexity and cost.

Notably, the supporting wheel may be a non-driven wheel i.e. a passive wheel or a motorized wheel, i.e. a wheel driven by means of a motor.

Even in the case of the supporting wheel being a non-driven wheel, it offers a judiciously placed pivot point that allows the user to turn the lift easily when it is transferring a patient. Even if the wheel cannot provide torque to rotate the lift, the user will benefit from a lever-arm effect due to the pivot point created by the fifth wheel. The addition of the supporting wheel limits the lateral motions of the patient transfer device especially with heavy patients. This in turn requires less effort for the user to control the patient transfer device for all manoeuvres.

The implementation of the motorized wheel further reduces the effort required to move the patient transfer device.

The supporting wheel 210 is preferably mounted to the chassis 100 via a transmission 300, as will be further described below.

Figure 2A:
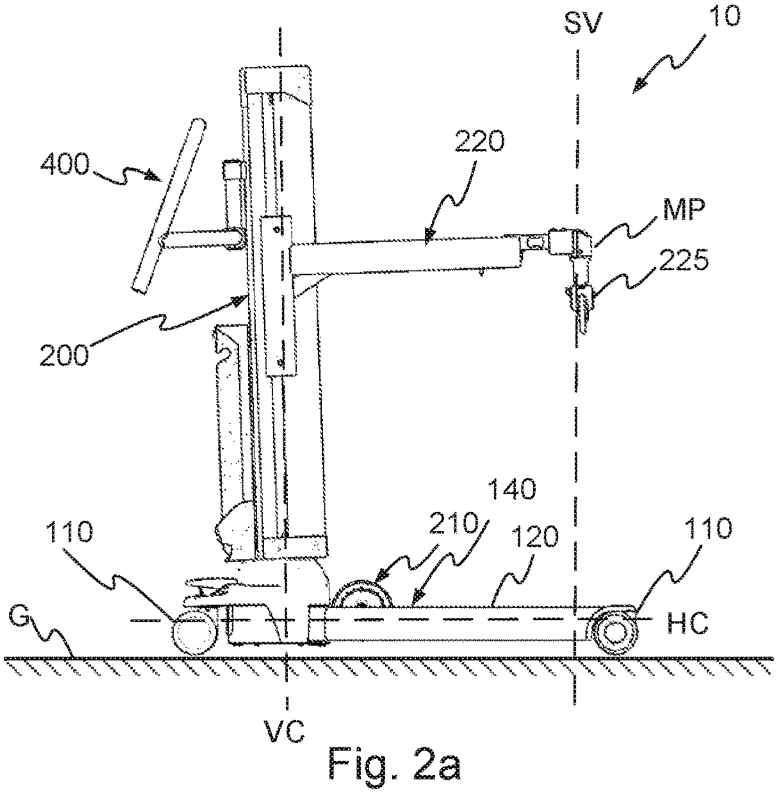
FIG. 2*a* is a side view of the patient transfer device shown in FIG. 1 where the motorized wheel is in an idle position.
Figure 2B:
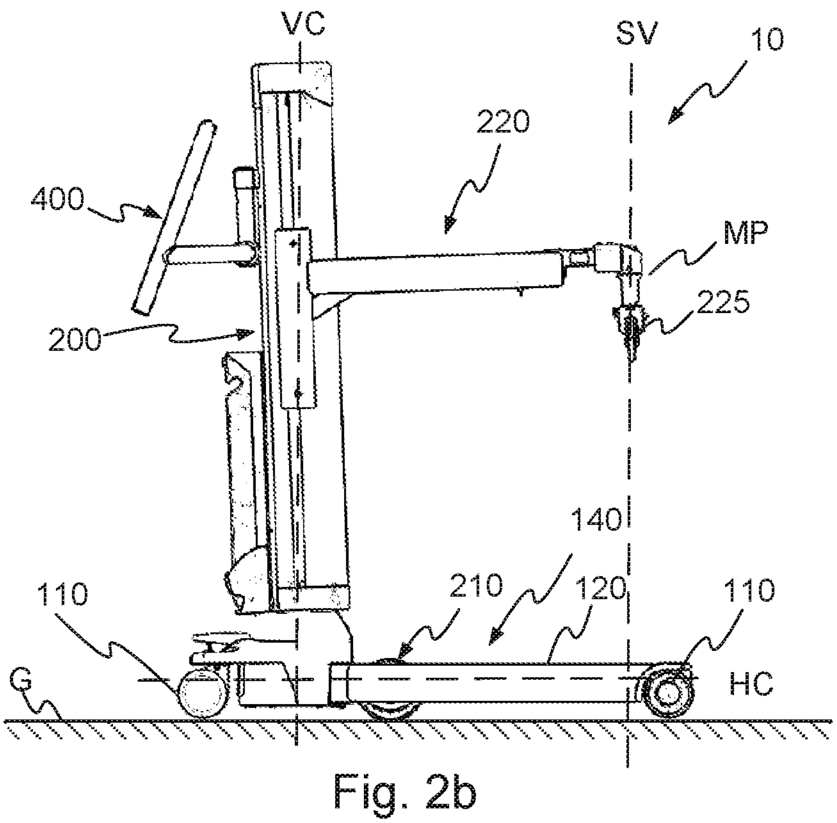
FIG. 2*b* is a side view of the patient transfer device shown in FIG. 1 where the motorized wheel is in an operational position.
Figure 2C:
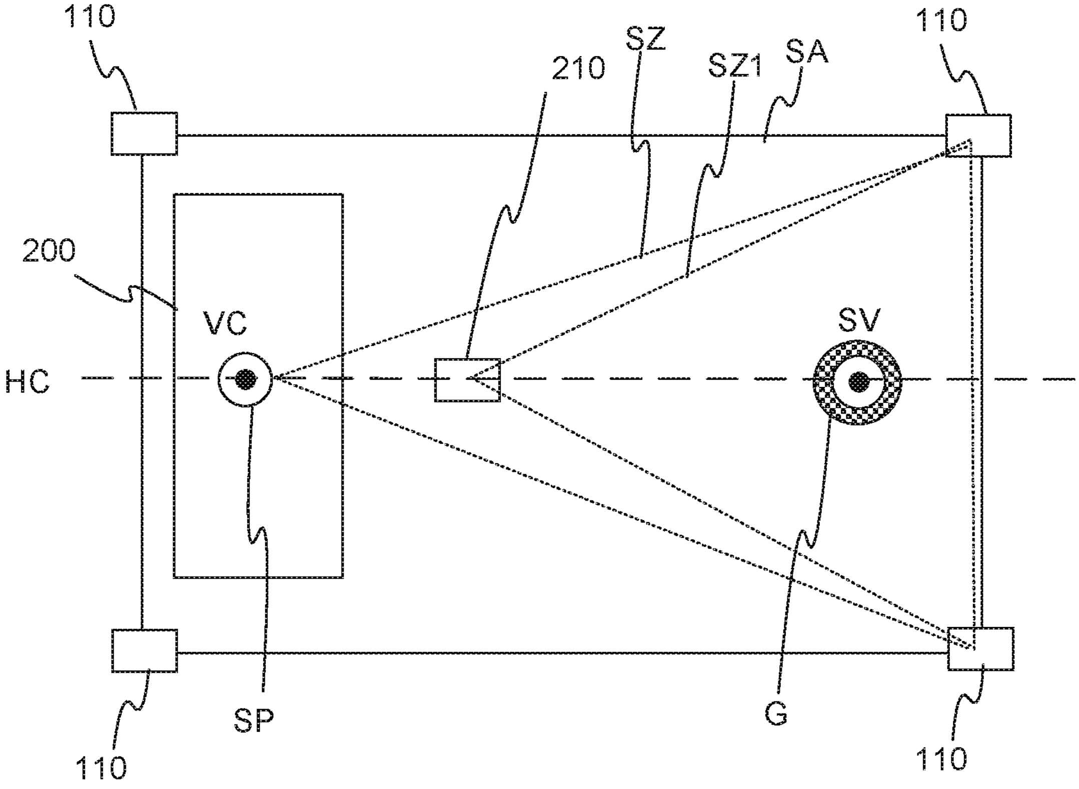
FIG. 2*c* is a schematic view of the orientation and placement of the wheels and vertical support structure of the patient transfer device according to an embodiment.

Turning now to FIGS. 2*a-c*, functions of the supporting wheel 210 will be further explained. In FIG. 2*a*, the supporting wheel 210 is shown at an idle position at which it is out of driving contact with the ground G. In this, with regards to the supporting wheel 210, idle state of the patient transfer device 10, the movement of the patient transfer device 10 along the ground G is assisted solely by the plurality of wheels 110.

The supporting wheel 210 is actuatable between an idle position where the supporting wheel 210 is elevated from the ground and an operational position where the supporting wheel is in contact with the ground. Actuatable herein refers to the supporting wheel being operable between said idle position and operational position.

In FIG. 2*b*, a supporting wheel in the form of a motorized wheel 210 is in an operational positon which puts the motorized wheel 210 in driving contact with the ground G. In the embodiment of the patient transfer device 10 of FIG. 2*b*, the operational position of the motorized wheel 210 adds a point of contact to the ground G. Typically, all wheels 110, 210 of the patient transfer device 10 will be in contact with the ground G due to the weight of a payload carried by the attachment means 225.

In FIG. 2*c*, the placement of the supporting wheel 210 relative the other wheels and the vertically extending support structure 200 is depicted.

The first and second front wheel of the plurality of wheels 110 are mounted to the base 140 at a horizontal distance from each other. Correspondingly, the first second back wheel of the plurality of wheels 110 are mounted to the base 140 at a horizontal distance from each other and the first and second front wheel.

The horizontal distances, i.e. the distances between the aforementioned wheels, defines a support area SA. The support area SA may be considered a delimited plane in the horizontal plane in which the base 140 extends. The supporting wheel 210 is mounted to the chassis 100 and arranged in a position in the horizontal plane disposed within the support area SA.

In the case of the supporting wheel 210 being retractable, the supporting wheel 210 may be mounted to the chassis 100 and arranged to be within the support area SA when the supporting wheel 210 is in contact with the ground.

The vertical centreline VC described with reference to FIG. 1 intersects the horizontal plane (and the support area SA) in a support point SP. The first and second front wheel and the support point SP defines a support zone SZ in the horizontal plane within the support area SA. The support zone SZ may thus form a triangular area extending between said wheels and the support point SP.

The base 140 extends along a horizontal centreline HC, which extends along the front-rear direction of the patient transfer device. The supporting wheel 210 may be aligned with the horizontal centreline HC.

The supporting wheel 210 is arranged adjacent to the support point SP. Preferably, the supporting wheel is mounted to the support structure 200.

As described with reference to FIG. 1, the vertically extending support structure 200 may be provided with the patient support and patient attachment means at the mounting position MP. The vertical support axis SV extending through the mounting position MP is depicted in FIG. 2*c*. The vertical support axis SV intersects the horizontal plane in a point disposed in a portion of the horizontal plane extending between the supporting wheel 210 and the first and second front wheel.

The portion of the plane may be in the form of a triangular area extending between the point which the vertical support axis SV intersects the horizontal plane and the first and second front wheel. The portion of plane is referenced as SZ1 in FIG. 2*c*. The portion of the plane may be a part of the support zone SZ.

As depicted in FIG. 2*c*, the centre of gravity of a patient G, i.e. a payload, supported by the patient support is aligned with the vertical support axis SV. Thus, the patient may be supported in a manner such that a vertical axis extending through centre of gravity G of said patient intersects the horizontal plane at a position between the first and second front wheel and the supporting wheel relative the horizontal centreline HC.

As evident for the skilled person, the centrelines and axes referenced above are imaginary axes.

Figure 3A:
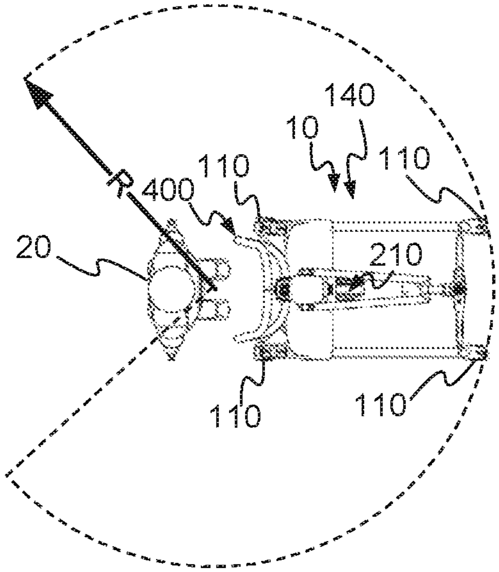
FIGS. 3*a-c* are top views of a patient transfer device according to an embodiment.
Figure 3B:
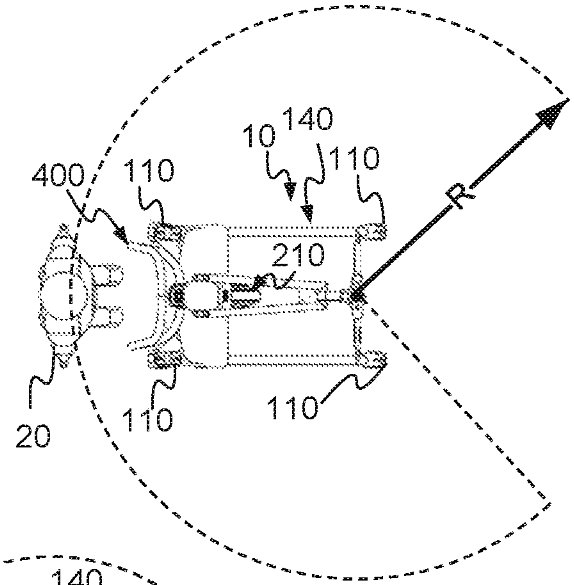
Figure 3C:
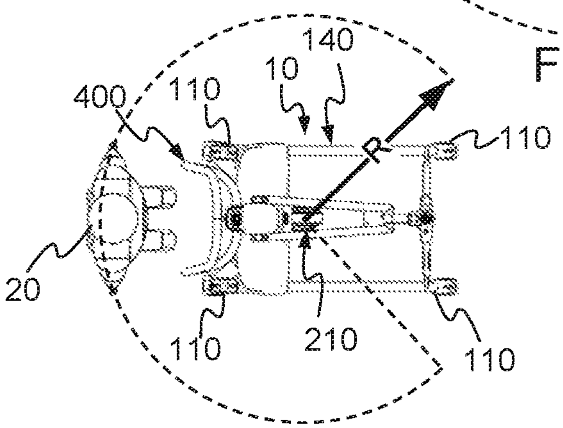

In FIGS. 3*a-c*, one effect of the supporting wheel 210 is illustrated. In FIG. 3*a*, the supporting wheel 210 is at its idle position, (as shown in FIG. 2*a*), and the patient transfer device 10 is turned about its rear end, the centre point of rotation being the position of the user 20. A turning radius R of the patient transfer device 10 is substantially a length of the patient transport support device 10 but typically even longer due to the difficulty to, from the handle 400, exert torque from the rear end.

Correspondingly in FIG. 3*b*, the patient transfer device 10 is turned around the patient suspension point 110. This is the centre of mass when a patient is being transferred, therefore it is the point around which the lift naturally tends to rotate.

A turning radius R of the patient transfer device 10 is substantially a length of the patient transport support device 10, including an addition to the turning radius distance caused by the user standing at a certain distance from the patient transfer device 10.

The operations illustrated in FIGS. 3*a-b* are the typical turning operations when dealing with prior art patient transfer devices 10.

Turning to FIG. 3*c*, the supporting wheel is in its operational position which means it is in contact with the ground. In one embodiment, in which the supporting wheel is motorized, the motorized wheel 210 is in its operational position in driving contact with the ground. Due to the traction, this makes it possible to rotate the patient transfer device 10 about the supporting wheel 210 which greatly reduces the turning radius R and also increases the torque possible to exert from the handle 400. The supporting wheel greatly reduces the effort required by the user 20 to move around with the patient transfer device 10, it reduces the risk of the patient swinging by the attachment means 225 during transfer and it improves the general usability and ergonomics of the patient transfer device 10.

A further benefit of particularly the motorized wheel 210 being movable between and an active position is that when the motorized wheel 210 is in its idle position, the patient transfer device 10 may be freely moved without the need of drive from the motorized wheel 210. In prior art patient transfer devices, the motorization needs to be always powered on, even when the floor lift is empty. This is required in order to allow moving of the prior art patient transfer devices since the motorization would effectively break any movements of the prior art patient transfer devices when motorization is powered off.

Figure 4:
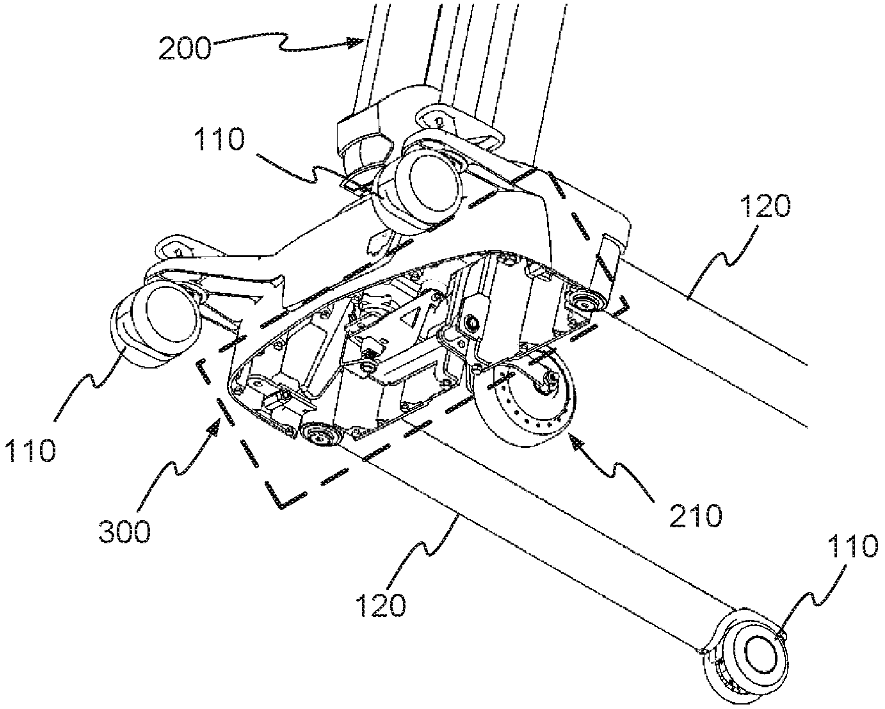
FIG. 4 is an isometric view of parts of a patient transfer device, seen from below, showing details of the supporting wheel.

As illustrated in FIG. 4, the supporting wheel 210 is preferably mounted to the chassis 100 by means of the transmission 300. The transmission 300 may mount the supporting wheel 210 either directly to the support structure 210, or via the horizontal bars 210. The skilled person will, after digesting the teachings of this disclosure, understand how to suitably attach the supporting wheel 210 to the chassis by transmission 300.

The purpose of the transmission 300 is to transition the supporting wheel 210 between the operational position and the idle position. This may be accomplished in numerous suitable ways and with reference to FIG. 5, one embodiment the transmission 300 will be explained.

The transmission may be manually operable or may comprise a motor for actuating the supporting wheel which may be a motorized or non-driven wheel. Notably, a motorized wheel herein refers to a wheel propelled/driven by means of a motor.

The transmission 300 typically comprises a transmission motor 310 that if operatively connected to the supporting wheel 210 to control the movement of the supporting wheel 210 between the operational position and the idle position. In one embodiment, the operative coupling may be directly provided by any suitable means and the position of the motorized wheel 210 may be controlled by controlling the current of the transmission motor 310.

Figure 5:
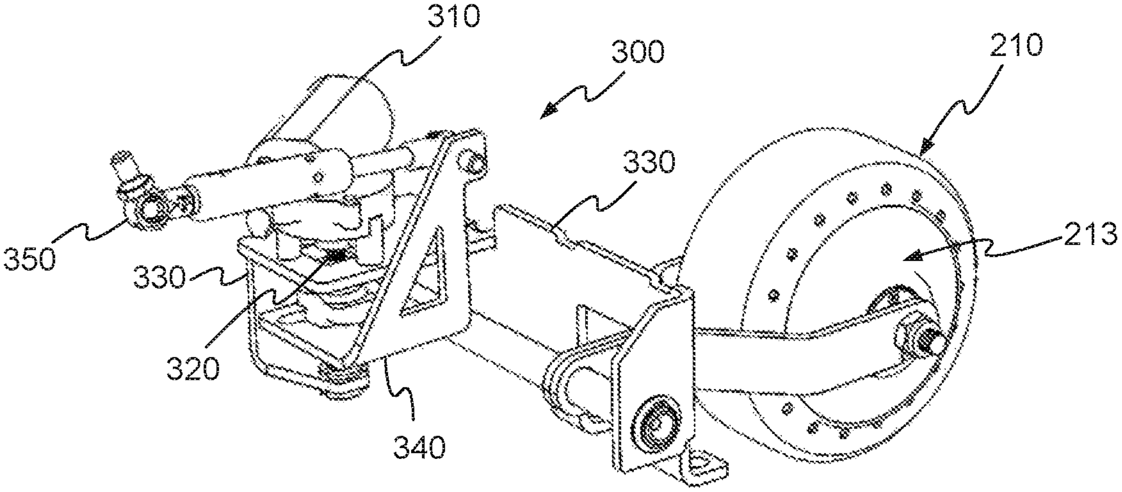
FIG. 5 is an isometric view of the supporting wheel and an associated transmission, forming part of a patient transfer device according to an embodiment.

In the embodiment of FIG. 5, this operative coupling is preferably provided by means of a lead screw 320, preferably an acme screw 320 attached to a link portion 340. The supporting wheel is attached to the link portion 340 and as the acme screw 320 is rotated by the transmission motor 310, the link portion 340 and the supporting wheel 210 are moved vertically bringing the supporting wheel 210 in and out of engagement with the ground G. In order to provide suspension to the supporting wheel 210, the link portion 340 may further be provided with attachment for a biasing device 350 arranged to dampen vibrations and uneven movements arising from the motorized wheel 210. Additionally, the biased section 350 provides an increased contact force between the supporting wheel 210 and the ground G to give enough traction to drive the patient transfer device 10. Also, the biased section allows the supporting wheel 210 to follow the ground G while still being able to clear obstacles when e.g. traversing thresholds etc. The dampening and biasing function may be provided by a spring means 350, preferably a gas spring 350. Notably, the dampening may also be provided by separate spring means, such as a compression spring or similar.

As depicted in FIG. 5, the link portion 340 may comprise a mounting part such as a mounting plate for attachment to the biasing device. The mounting part may be attached to the shaft of the link portion to form said link portion.

The transmission 300 may, in some optional embodiments of the patient transfer device 10, be configured to, when the supporting wheel 210 is in the operational position, exert a predetermined or configurable biasing force towards the ground G. This may be accomplished by e.g. controlling the current provided to the transmission motor 310 necessary to put the supporting wheel 210 in engagement with the ground. The current may be controlled by means of sampling. The transmission may be configured to control the current provided to the transmission motor 310 to a predetermined or configurable level. If the supporting wheel 210 is out of contact with the ground G, the current provided to the transmission motor 310 will increase and by controlling the current of the transmission motor 310 the predetermined or configurable level, the supporting wheel 210 is put back into engagement with the ground G. Correspondingly, if the supporting wheel 210 gets stuck at e.g. a threshold, the supporting wheel 210 will be pushed upwards and the current to the transmission motor 310 will decrease below the predetermined of configurable level and as the current of the transmission motor 310 is controller to the predetermined or configurable level, the supporting wheel 210 is raised in order to traverse the obstacle. The control of the transmission 300 may be performed by any suitable control means, preferably by a controller 500, FIG. 6*a*, as will be further explained in coming sections. The current provided to the transmission motor 310 will, depending on configuration, increase or decrease when the supporting wheel is stuck out of contact with the ground G as exemplified above. The skilled person will understand that the change in current mentioned above, be it positive or negative, will be dependent on the design and/or configuration of e.g. the transmission 300.

The supporting wheel 210 as described, will facilitate the manoeuvrability of the patient transfer device 10 when the supporting wheel is in the operational position. Having the supporting wheel 210 being controlled by the transmission 300 is beneficial since it allows the patient transfer device 10 to be handled and used as a prior art patient transfer device when e.g. handled by users 20 not familiar with the novel and inventive patient transfer device 10 of the present invention, or when no payload is present. In order to further ease the manoeuvrability of the patient transfer device 10, the supporting wheel is a motorized wheel 210 which is provided with a propulsion means, preferably a hub motor 213 arranged at a hub of the motorized wheel 210. The hub motor 213 will allow for assisted movement of the patient transfer device 10 and may also be arranged as a safety measure to actively stop the patient transfer device 10 from moving in a parked or loading state.

The motor 310 of the transmission 300 and the hub motor 213 of the motorized wheel 210 are typically powered by one or more batteries 600 and controlled by one or more controllers 500, these will be explained in greater detail in following sections with reference to FIG. 6*a*.

In an alternative embodiment, the motor driving the motorized wheel may be arranged outside the motorized wheel. According to such an embodiment, the motor driving the motorized wheel may be mechanically connected to the motorized wheel by means of a wheel transmission. Further, in order to allow for selective drive of the motorized wheel, a coupling may be arranged the motorized wheel and the motor. The coupling being configured to control the torque provided to the motorized wheel from the motor.

Figure 6A:
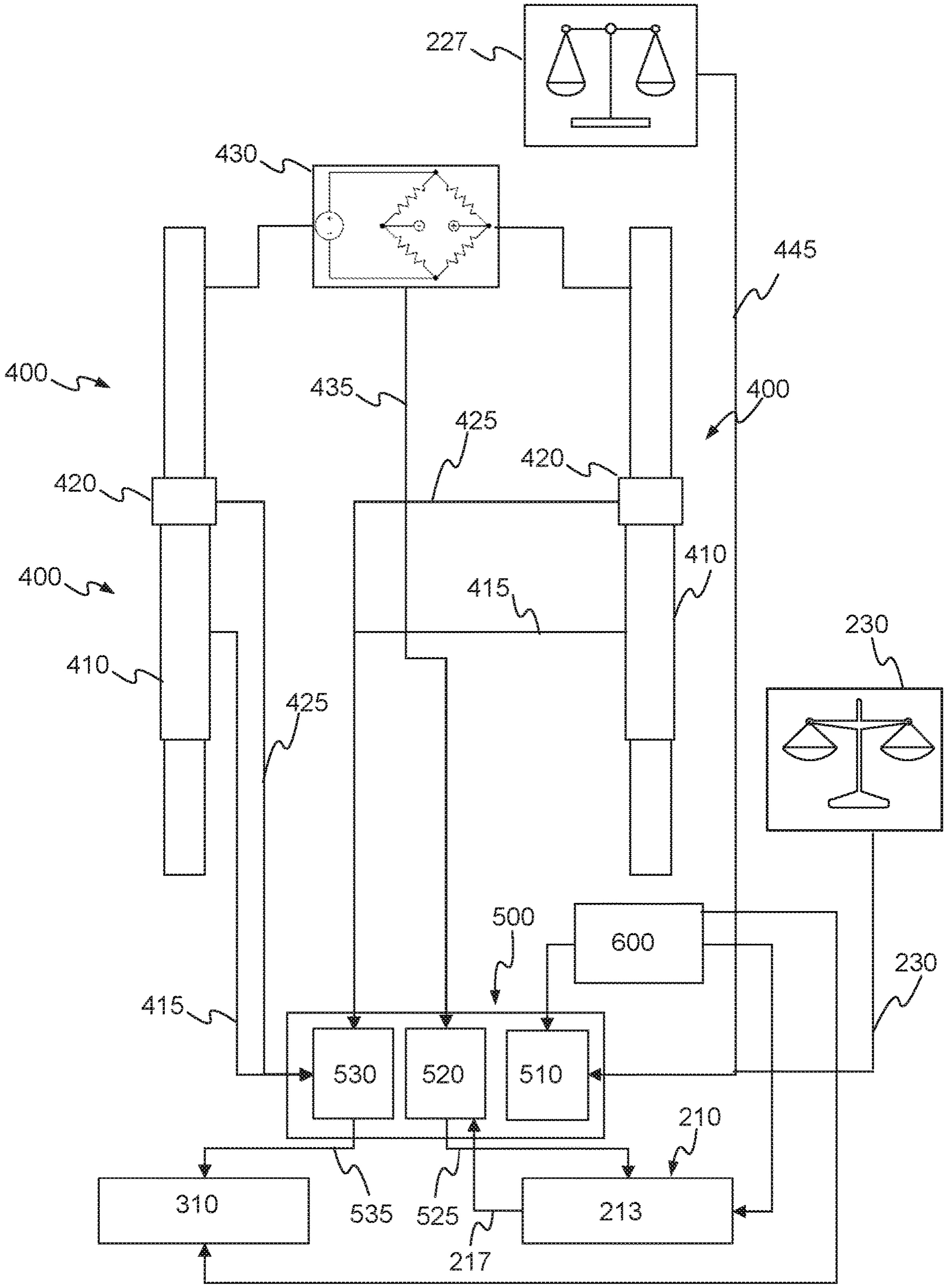
FIG. 6*a* is a schematic view of parts of a patient transfer device according to an embodiment.

FIG. 6*a* depicts a schematic view of parts of a patient transfer device 10 according to embodiments of the present invention. The schematic view illustrates the controller 500 that may be configured to control the transmission motor 310 and/or the hub motor 213. The controller 500 is powered by the battery 600 and in order to determine if a patient is supported by the attachment means 225, the patient support 220 and/or attachment means 225 is provided with one or more payload sensing devices 227. The payload sensing device 227 may be any suitable sensor, discrete or comprised in a sensor arrangement. The payload sensing device 227 may be arranged to detect a payload directly at the patient support 220 and/or the attachment means 225 by e.g. a weight sensing element and/or a scale element. Alternatively or additionally, the payload sensing device may comprise sensors arranged to determine the presence of the payload by detecting a current required to lift or hold the attachment means 225 levelled. The payload sensing device 227 may further be configured to estimate a mass of the payload. In one embodiment, the patient support 220 is connected to a lifting/lowering motor for lowering/lifting the patient support. The lowering/lifting motor may be operatively connected to the controller 500. The payload sensing device 227 may thus be configured to monitor the motor current of the lowering/lifting motor, whereby the controller 500 may be configured to determine the payload based on an input signal of the payload sensing device indicative of the motor current of the lowering/lifting motor.

The payload sensing device 227 is operatively connected to the controller 500, preferably to an initiation module 510 of the controller 500. The payload sensing device 227 may be configured to provide the controller 500 with a payload signal 445 indicative of the presence of a payload at the attachment means 225 and/or patient support 220. The payload signal 445 may comprise weight information of the payload. The controller 500 may be configured to determine the presence of a payload by comparing weight information provided by the payload sensing device 227 to one or more upper and/or lower threshold values. The controller 500 may be configured to prevent some or all uses of the patient transport device 10 if the weight of the payload provided by the payload sensing device 227 is above an upper threshold value, i.e. if the patient is too heavy.

As a safety precaution, the patient support device 10 may further comprise a tilt sensor 230 configured to sense if the patient support device 10 is leaning or tilting and provide feedback to that matter to the controller 500, preferably to the initiation module 510 of the controller 500.

In order to determine if a user 20 is present and ready to operate the patient transfer device 10, the handle 400 may be provided with at least one sensor 410 for determining if the user 20 is gripping the handle 400. The sensor 410 may be configured to generate a grip signal 415 to the controller 500 indicating if the user 20 is gripping the handle 400 or not. The sensor 410 may be any suitable sensor such as an ultrasonic proximity sensor, a surface acoustic wave sensor, a capacitive sensor, a resistive sensor, an electromechanical switch or combinations thereof. In a preferred embodiment of the patient transfer device 10, the sensor 410 is a surface acoustic sensor, preferably in the form of an ultrasonic sensor where an ultrasonic transmitter is arranged towards the surface of the handle 400 and configured to measure the reflected sound which will change if e.g. a hand of the user 20 is present at the handle 400. The sensor 410 is operatively connected to the controller 500, preferably to an activation module 530 of the controller 500. The controller 500 may be configured to activate the motorized wheel 210 based, at least partly, on the grip signal 415. Preferably, if the handle 400 is provided with e.g. a left hand handle 400 and a right hand handle 400, each handle 400 is provided with at least one sensor 410.

The handle 400 may further be provided with one or more means 420 for determining user activation of the patient transfer device 10. The means 420 for determining user activation is operatively connected to the controller 500, preferably to the activation module 530 of the controller 500. The means 420 for determining user activation may be configured to generate an activation signal 425 to the controller 500 indicating if the user 20 intends to activate the patient transfer device 10, i.e. placing the motorized wheel 210 in engagement with the ground G. The means 420 for determining user activation may, as the sensor 410, be any suitable sensor such as an ultrasonic proximity sensor, a surface acoustic wave sensor, a capacitive sensor, a resistive sensor, an electromechanical switch or combinations thereof, preferably arranged as a thumb grip sensor. The controller 500 may be configured to activate the motorized wheel 210 based, at least partly, on the activation signal 425. Preferably, if the handle 400 is provided with e.g. a left hand handle 400 and a right hand handle 400, each handle 400 is provided with at least one means 420 for determining user activation.

The handle 400 may further be provided with one or more force sensors 430 configured to measure a force applied to the patient transfer device 10 by a user 20 or care giver 20. The force sensor 430 is operatively connected to the controller 500, preferably to a drive module 520 of the controller 500. The force sensor 430 may be configured to generate a force signal 435 to the controller 500. The controller 500 may be configured to control the hub motor 213 of the motorized wheel 210 based, at least partly, on the force signal 435. The one or more force sensors 430 may be in the form of e.g. piezoelectric pressure sensors arranged at a portion of the handle 400 where it attaches to the support structure 200, an accelerometer, configured to detect accelerations in one or more directions and/or preferably as an instrumented tube configured to measure the force on the handle. The instrumented tube may be configured as one full strain gauge bridge with differential bridge design for the longitudinal axis making it insensitive to vertical position of load applications, i.e. it will be insensitive to bending stresses. The controller 500 may further be configured to receive data 217 from the motorized wheel 210, such data 217 may be indicative of e.g. a current provided to the motorized wheel 210, a speed of the motorized wheel 210 and/or a torque exerted by the hub motor 213 etc. This data 217 may be used by the controller 500, preferably the drive module 520, to control the motorized wheel 210.

It should be appreciated that, albeit the controller 500 is described as receiving input and/or user control from the handle 400, it may very well be configured to receive input and/or user control from any other suitable control means forming part of this disclosure.

The data from the motorized wheel 210 may be in the form of a current provided to the motorized wheel 210. In embodiments, the data from the motorized wheel is a combination of the current provided to the motorized wheel 210 and a rotational speed for the motorized wheel 210. Based on this data, the controller 500 may be configured to detect e.g. that the motorized wheel 210 is spinning on the ground if a high speed and low current, i.e. low torque, is detected, or that the motorized wheel 210, or the patient transfer device 10, is blocked is a low speed, zero-speed, and a high current, i.e. high torque, is detected. The controller 500 may be configured to alert the user 20 of such conditions, and/or to stop/reduce the drive of the motorized wheel 210. The controller 500 may be configured to, in response to detecting that the motorized wheel 210 is spinning without the patient transfer device 10 moving, further lower the motorized wheel 210 in order to increase the traction between the motorized wheel and the floor.

When controlling the motorized wheel 210, consideration of e.g. effort of the user, manoeuvrability of the patient transfer device 10 and/or comfort of the patient being transferred. There are standards governing, or at least indicating, acceptable forces to be applied to a patient transfer device 10 when transferring a patient. Examples of such standards are ISO 10535:2006 which imposes a maximum starting force of 160 N and a maximum driving force of 65 N. Regarding the comfort of the patient, whom is often frail and may suffer from cognitive impairments, The ISO 2631-1:1997 automotive standard presents a method to determine the quality of the motion in terms of comfort. As mentioned elsewhere in this disclosure, the addition of motorised wheel 210 to a e.g. a basic floor lift with four swivelling wheels provide power to assist users while they are pushing the lift forward or backward. A wheel may be linked to a load cell fixed on the handle of the lift to measure the user's intentions. Further to this, the supporting and/or motorized wheel 210 provides a judiciously placed pivot point that allows the user to easily turn the patient transfer device 10 when it is transferring a patient. Even if the motorized wheel 210 is unable to provide torque to rotate the lift, the user will benefit from a lever-arm effect due to the pivot point created by the supporting and/or motorized wheel 210.

Figure 6B:
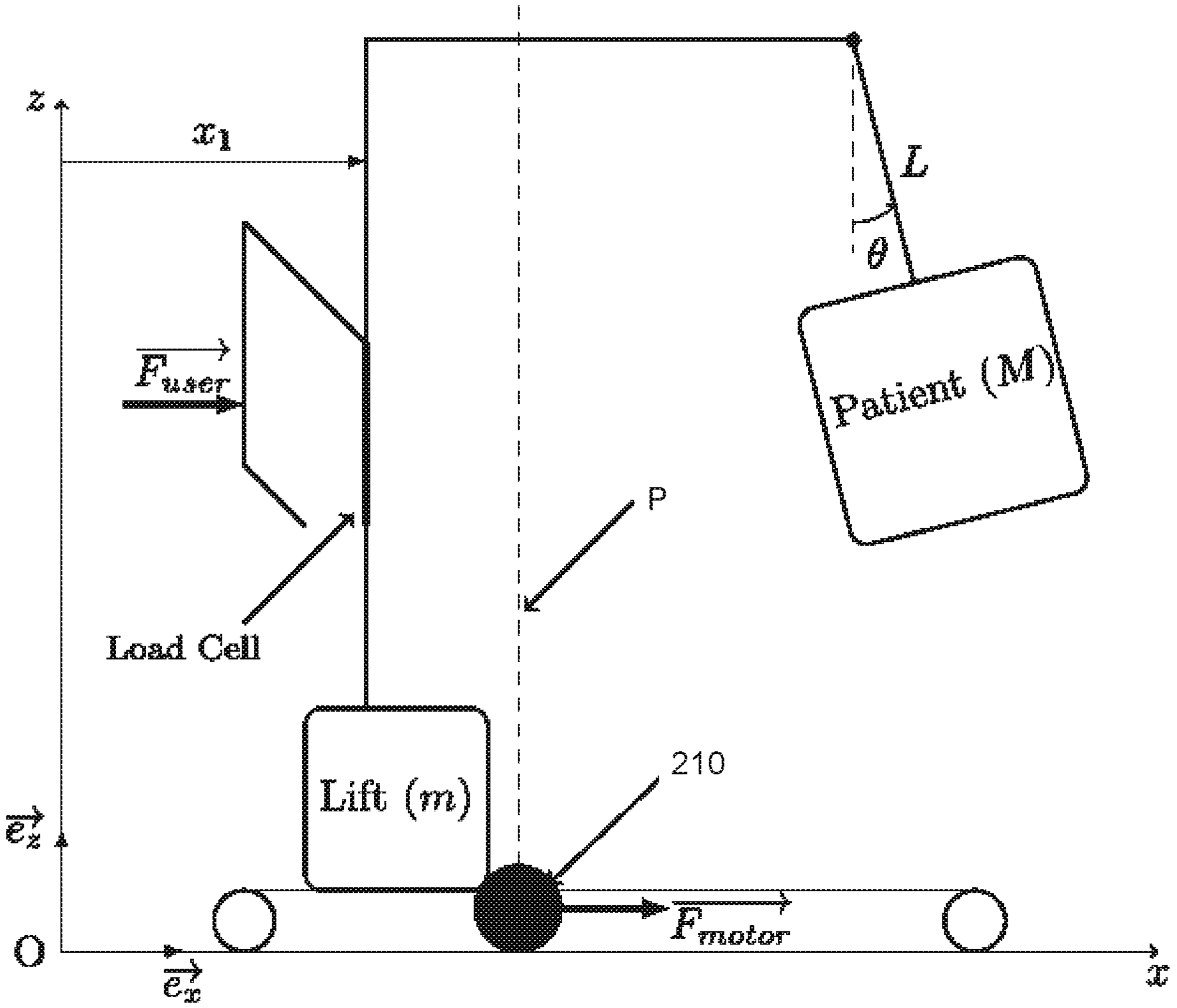
FIG. 6*b* is a schematic side view of a patient transfer device carrying a payload.

With reference to FIG. **6*b*, a longitudinal dynamic model for the patient transfer device 10 will be presented. FIG. 6*b* is a schematic representation of the supporting and/or motorized wheel 210 composed of a first mass m in translation and a second suspended mass M in rotation. The user and the motorized wheel 210 are pushing on the patient transfer device 10. A pivot point P is provided by the motorized wheel 210, allowing the user to turn the lift easily. The longitudinal dynamic model is composed of first mass m representing the patient transfer device moving in linear motion and the second suspended mass M representing the patient balancing motions in the patient attachment means 225. This system of FIG. 6*b* is submitted to the motorised wheel's 210 and the user's efforts. It should be mentioned that some external perturbations may influence the behaviour of the system, such as dry or viscous friction. Generally, patient transfer devices 10** are designed to transfer payloads of up to 272 kg. Thus, different weights of patients are preferably taken into consideration to design the controller. The dynamic model is described in Eqn. 1 below:

$$\begin{cases} ML^2\ddot{\theta} + ML\ddot{x}\cos(\theta) + MgL\sin(\theta) = 0 \\ (m+M)\ddot{x}_1 + ML\ddot{\theta}\cos(\theta) - ML\dot{\theta}^2\sin(\theta) = F_{ext} \\ F_{ext} = F_{user} + F_{motor} + F_{perturbation} \end{cases} \quad \text{Eqn. 1}$$

Based on the dynamic model of Eqn. 1, the differential equations may be implemented through e.g. a computer simulation to evaluate the performances.

In order to translate a force applied by the user to a current provided to the motorized wheel 210, different control architectures are proposed. These controlled architectures are preferably implemented by means of the controller 500 in e.g. the previously presented drive module 520 of the controller 500. Generally, the current provided to the motorized wheel 210 is generated by a current controller configured to control a current provided to the motor based on a wanted control current and current current data 217.

In one embodiment, the drive module 520 is implemented as a friction compensation controller 520. The friction compensation controller 520 preferably estimates a resistive force at the motorized wheel 210 using e.g. a velocity measurement and compensates it with the motorised wheel 210. This embodiment has the advantage of allowing the user to push on the patient transfer device 10 at substantially any contact point since the user force measurement is not required. However, the variety of external conditions, such as the floor type (carpet, concrete, and parquet), sling strap length (the length of the straps of the sling which supports the patient) or the weight of the patient makes it challenging to accurately estimate the resistive force at the motorized wheel 210. Furthermore, with a too aggressive compensations of the friction force, there is a risk of overestimating the friction that may lead to system instability.

In another embodiment, the drive module 520 is implemented as a force amplification scheme. This force amplification scheme preferably leverage an instrumented handle 400, the user's force is preferably measured and filtered in real time. The motorized wheel 210 is in this embodiment urged to provide an assistance force proportional to the user's force. This embodiment is beneficial as this control scheme directly converts the force of the user into torque on the motorized wheel. The user's applied force directly affects the motion of the patient transfer device 10, resulting in improved manoeuvrability. Further to this, the patient transfer device 10 remains backdrivable if a user tries to move it without using the handle 400.

In a preferred embodiment, the drive module 520 is implemented comprising an admittance control scheme. In the admittance control scheme, the drive module utilizes both data 217 from the motorized wheel 210 and data indicative of a force applied to the handle 400 by the user. A velocity controller is preferably used at low levels to impose motion of the motorized wheel 210. A desired velocity of the motorized wheel 210 may be computed by an outer control loop that comprises a virtual dynamic model (mass damper) which input is the user force at the handle 400. In other words, the user's force is, by the drive module 520, converted into a speed of the motorized wheel 210. The motion of the motorized wheel is imposed by the drive module 520, which determines the torque of the wheel. With this approach, the behaviour of the patient transfer device 10 is insensitive to a change in the weight of the patient or a change in friction due to different floor conditions (linoleum, concrete, tile, carpet, etc.). For a given input force of the user, the same final speed will be reached regardless of the external conditions. As the previous embodiment will control a torque of the motorized wheel based on a force applied by the user, the final speed will, in that embodiment, depend on the friction conditions and the weight of the patient. The admittance control scheme may be compared to a cruise control system of a car, where a wanted speed is selected and the car keeps the wanted speed regardless of a slope of the road.

In admittance control, intentions of the user are preferably determined by the previously explained force sensor operatively connected to the handle 400 of the patient transfer device 10. Preferably, the admittance control is implemented using a virtual dynamic system, mass M and damping ratio $b_0$, to convert the force F of the user into a desired velocity $v_d$ using the Eqn. 2 below:

$$F = M\dot{v}_d + b_0 v_d \qquad \text{Eqn. 2}$$

By defining $$\tau = \frac{M}{b_0}$$

as a time constant and $$K = \frac{1}{b_0}$$

as a gain ractor, the admittance control may be presented with Laplace notation according to Eqn. 3 below:

$$\frac{V(s)}{F(s)} = \frac{K}{1 + \tau s} \qquad \text{Eqn. 4}$$

The gain factor K will govern the force that the user must apply at a certain velocity and the time constant τ controls a transient responses during operations such as change of direction, stopping or starting. As the admittance control reflects the comportment of a simple mass in linear motion with a damping ratio, which is something naturally understandable, it is very intuitive for the user to feel and understand how the patient transfer device 10 works.

In a further embodiment of the admittance control, the drive module 520 is implemented comprising variable admittance control. The variable admittance control comprises in changing the admittance law coefficients depending on the situation. Damping coefficient of an admittance control has a simultaneous impact on a response time and the final response of the admittance controller. A variable admittance controller may be implemented by adapting the damping coefficient to the user's intentions. As an example, when the patient transfer device 10 is going in one direction, and the user is pushing towards another direction, the user intends to change the direction of the patient transfer device 10. The patient transfer device 10 is consequently controlled to promptly decelerate, which means that the admittance controller is preferably configured with a relatively high damping ratio. Further to this, when the patient transfer device 10 is going towards a specific direction and the user is pushing in the same direction, the user intends the patient transfer device 10 to go faster. The patient transfer device 10 is consequently controlled to accelerate, which means that the admittance controller is preferably configured with a relatively low damping ratio. Consequently, damping coefficients b may be determined based on a velocity vector V of the patient transfer device 10 and a force vector F of the force applied to the patient transfer device 10 by the user. This may be summarized by Eqn. 5 below:

$$b = \alpha + \beta \times \text{sign}(V) \times F \qquad \text{Eqn. 5}$$

The coefficients α and β are preferably tuned to get a good behaviour of the patient transfer device 10 at low speeds and to have the same sensitivity at maximal speeds as the admittance controller as previously presented. One specific non-limiting example is that is requires 30 N to get to 0.8 m/s. However, the damping coefficient may be limited to prevent the lift from being too sensitive and hard to control.

Modifying the damping coefficient, as disclosed in the embodiment above, has an impact on the patient transfer device's 10 dynamics, especially on its response time. This comportment ensures a quick reply to the user's intentions by having a more or less important damping coefficient adapted to the situation. It also has an impact on the final velocity of the patient transfer device 10. The non-linearity generated by the varying damping coefficient provides an improved resolution of the drive module 520, which allows the user to have a better feeling of manoeuvrability at a low speed. Because it requires a bigger amount of force than a simple admittance controller, it is easier for the user to make small adjustments, thanks to the large variation range of force, which is more spread out than a simple admittance controller.

In general, in prior art devices, in which the motorized wheels are weight bearing for the entire device, a lot of traction is required to move the device. With the motorized wheel 210 of the invention, a safer design is accomplished since the force of the motorized wheel 210 on the ground G is just enough to have good traction to help manoeuvred the patient transfer device 10. As the patient transfer device 10 comes in contact with an obstacle, the motorized wheel 210 will typically start slipping, or the current provided to the motorized wheel 210 will increase. In some embodiment of the patient transfer device 10, the controller 500 is configured to receive data from the motorized wheel 210 indicative of the amount of current provided to the motorized wheel 210. The controller 500 may be configured to detect a rise in said current and in response to this rise, disable the drive of the motorized wheel 210. Such detections and actions may be suitable from a safety perspective as it would be a means to detect if e.g. the patient transfer device 10 is about to e.g. run over a foot or other or take away a doorframe.

The controller 500 may be any suitable controller or controllers, e.g. processing means such as MCUs etc. The different modules 510, 520, 530 of the controller 500 may be one or more standalone controller operative connected to or controlled by the controller 500. Alternatively or additionally, the different modules 510, 520, 530 may be software modules of processes executed by the controller 500.

Figure 7:
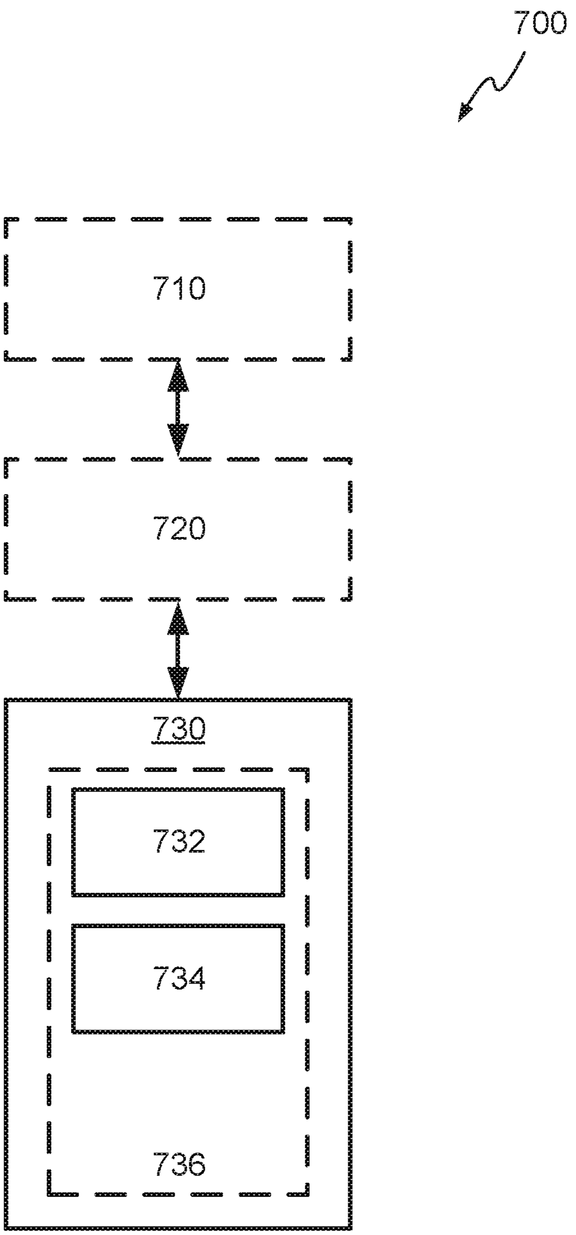
FIG. 7 is a schematic view of a method for a patient transfer device according to an embodiment.

In FIG. 7, a method 700 for controlling a patient transfer device 10 is schematically illustrated. The method 700 comprises the optional step of determining 710 initiation of the patient transfer device 10. The step of determining initiation 710 of the patient transfer device 10 may comprise initiation steps such as initiating any sensors e.g. the payload sensing device 227, the tilt sensor 230, the sensor 410 for determining the grip of the user 20, the means 420 for determining user activation and/or the force sensor 430. Such initiation may comprise taring and/or calibration of the sensor(s). During the step of initiating 710 of the patient transfer device 10, the patient transfer device 10 may indicate that no user 20 or patient should be in contact with the patient transfer device 10. Such indications may be audio and/or visual indications. The step of determining initiation 710 of the patient transfer device 10 may be executed each time the patient transfer device 10 is powered, at predetermined or random intervals, during charging of the patient support device 10 and/or during maintenance or service of the patient transfer device 10.

The initiated patient transfer device 10 may be placed in an idle state, preferably with low power consumption, wherein only one or more of the sensors e.g. the payload sensing device 227, the tilt sensor 230, the sensor 410 for determining the grip of the user 20, the means 420 for determining user activation and/or the force sensor 430, are active. Additionally or alternatively, some of the sensors, preferably the sensor 410 for determining the grip of the user 20, may be illuminated such that a user 20 is made aware of the idle state and readiness of the patient support device. The method 700 may further comprises the optional step of determining activation 720 of the patient transfer device 10. This may be initiated by e.g. the sensor 410 for determining the grip of the user 20 detects user 20 interaction with the patient transfer device 10. Such interaction may be in the form of the user 20 engaging, by gripping, one or both the handles 400 of the patient transfer device 10. As user interaction is detected, the method 700 may commence to the step of controlling 730 the patient transfer device 10, see next section, but may optionally require manual activation by the user 20 in order to be activated. This may be accomplished by e.g. the user interacting with the means 420 for determining user activation. In one embodiment, the means 420 for determining user activation is illuminated when the sensor 410 for determining the grip of the user 20 detects user 20 interaction with the patient transfer device 10 to assist the user 20 in the execution of the method 700.

Upon having determined that the user 20 desires to activate the patient transfer device 10, the method initiates the step of controlling 730 the patient transfer device 10. This may comprise arranging 732 the motorized wheel 210 in driving contact with the ground G by e.g. activating the transmission 300, and particularly the transmission motor 310. Once the motorized wheel 210 is in driving contact with the ground G, the step of controlling 730 the patient transfer device 10 further comprise controlling 734 a speed of the motorized wheel 210. This control 734 of the speed may be based on a predetermined or configurable speed. Preferably, the controlling 734 of the speed of the motorized wheel 210 is based on a horizontal force applied by the user 20 to the patient transfer device 10. This force may be e.g. the force sensor 430 as explained above. In one preferred embodiment, the controlling 734 of the speed is performed based on admittance control and/or variable admittance control as previously presented.

In one embodiment of the method 700, the controlling 734 of the speed of the motorized wheel 210 is based on the horizontal force applied by the user 20 to the patient transfer device 10 such that the assistance provided by the motorized wheel 210 in moving the patient transfer device 10 corresponds to transporting a patient of a predetermined or configurable comfort weight. This is beneficial since this forces the user 20 to apply some force, giving the user 20 the impression that he or she is in full control of the movement and reduce the risk of the patient support device 10 running ahead since the user 20 still actively has to push or pull the patient transfer device in order to get the assistance from the motorized wheel 210. In one preferred embodiment, the comfort weight is 40 kg, meaning that, regardless of the weight of the payload, i.e. the patient, the user 20 will feel like he or she is transporting about 40 kg when the motorized wheel 210 is assisting in the movement of the patient transfer device 10.

As a safety precaution, the step of controlling 730 the patient transfer device 10 may further comprise monitoring 736 the patient transfer device 10. The step of monitoring the patient transfer device may actually be run also in parallel with any or all of the other steps 710, 720 of the method 700 although not shown in FIG. 7. Upon detection of e.g. abnormalities, unwanted or unexpected data etc. during the monitoring 736, the method 700 may be stopped or at least the controlling 734 of the speed of the motorized wheel, the arranging of the motorized wheel and/or the activation 720 may be stopped or reverted. The monitoring 736 may comprise collecting data from any or all of the sensors of the patient transfer device 10 to ensure that it is operating in a preferred manner. In one embodiment, the monitoring 736 comprises evaluating the vertical orientation of the patient transfer device 10. This may be done by e.g. monitoring the tilt sensor 230 to determine if the patient transfer device is leaning at an angle that is larger than a predetermined or configurable tilting threshold. The monitoring 736 may comprise monitoring of the user 20 interactions with the patient transfer device 10 to determine if the user 20 no longer activates and/or grips the patient support device 10. Hand, i.e. grip, detection on the handle 400 may be used to ensure that the user 20 keeps at least one hand on the handle 400 while manoeuvring, and allowing the user 20 to move his or her hand(s) anywhere on the handle 400 while keeping the motorized assistance activated, and deactivating the motorized assistance when the user 20 let go of the handle 400.

Notably, the deactivation of the motorized assistance may be achieved in multiple ways readily available for the skilled person. The deactivation of the motorized assistance may be achieved by means of retraction of the motorized wheel in accordance with what is described with reference to FIG. 2*a-b*. Alternatively, the deactivation may be achieved by means of deactivation of the motor driving the motorized wheel, activation of a clutch to decouple the motorized wheel from the motor etc.

In one embodiment of the method 700, the step of controlling 730 the patient transfer device 10 is not entered unless a payload above a threshold weight value is detected. The weight of the payload may be detected by e.g. the payload sensing device 227. In a preferred embodiment, the threshold weight is 45 kg. The monitoring 736 may further comprise monitoring the weight of the payload and to stop some or all active method steps if the payload value changes or changes by more than an allowable amount. Alternatively or additionally, the step of controlling 730 the patient transfer device 10 is not entered unless a current power level of the battery 600 is above a threshold power. The power of the battery 600 may be detected by e.g. estimating the power based on a voltage of the battery 600, a capacity of the battery 600, a self-discharge of the battery 600, a use of the battery 600 and/or a current provided by the battery 600. In a preferred embodiment, the threshold power is 20% of a maximum power of the battery 600. The monitoring 736 may further comprise monitoring the power level of the battery 600 and to stop some or all active method steps if the power level of the battery 600 drops below the threshold power level or a second threshold power level.

Deactivating the motorized assistance when no patients are on the lift, e.g. when the weight of the payload is below the threshold weight, is beneficial since it is e.g. not energy efficient to have assistance during such conditions. Further to this, it allows deactivating for some manoeuvring like pure sideways movement in which case the pivot point is useless or may even block some degrees of freedom.

In one embodiment, the controller 500 is configured to perform the method 700.

In the previous sections, embodiments of a patient transfer device 10 and an associated method 700 for controlling the patient transfer device 10 have been presented together with a certain amount of detail. The embodiments presented are in not to be considered to exhaust the entire inventive concept of the invention, but are rather ways of exemplifying the present invention. The inventive patient transfer device 10 is a patient transfer device wherein only one motorized wheel 210 is installed in a strategic location to reduce starting force and assisting in going straight when there is a patient supported by the device 10. The placement of the motorized wheel 210 at the support structure 200 also helps rotation by adding a pivot point judiciously positioned so the control and the turning becomes natural for the users 20 moving the patient transfer device 10.

According to an aspect a patient transfer device which implements the above driving control is provided. The patient transfer device may optionally have a similar placement of the motorized wheel as described with reference to FIG. 2*c*. Thus, a patient transfer device according to the following is provided. The patient transfer device 10 comprises a chassis 100 having a plurality of wheels 110 and a vertically extending support structure 200. The patient transfer device 10 further comprises a base 140 which may be arranged in a horizontal plane extending perpendicular to the support structure 200. The patient transfer device comprises at least one motorized wheel 210 and is provided with a handle 400 for manoeuvring of the patient transfer device 10. The handle 400 is provided with at least one sensor 410 for determining a grip, i.e. a grip of the handle, of a user. The patient transfer device 10 further comprises a controller 500 operatively connected to the at least one motorized wheel 210 and the sensor 410. The controller is configured to control the operation of the at least one motorized wheel 210 in response to input from the sensor 410.

Optionally, the patient transfer device is a patient transfer device according to any one of the above described embodiments.

Figure 8:
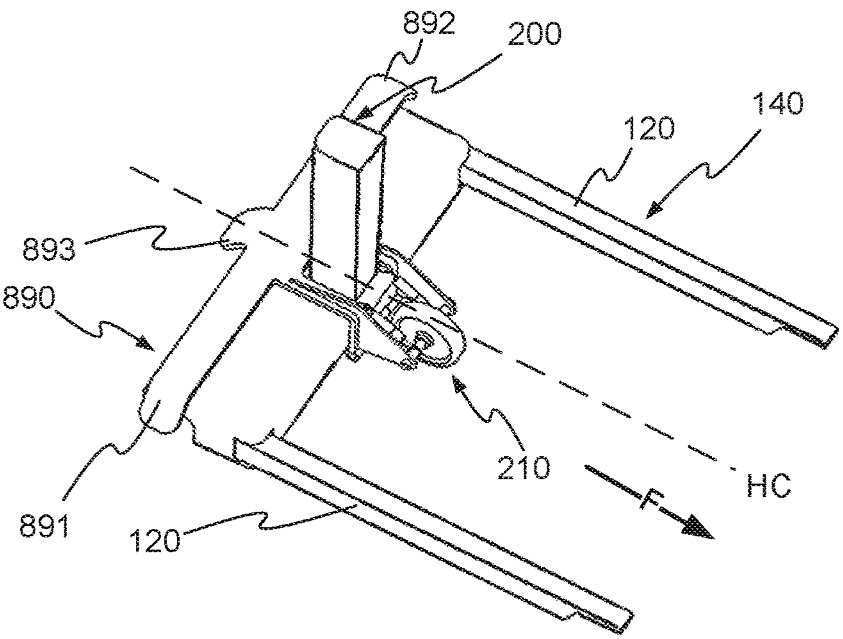
FIG. 8 is an isometric view of parts of a patient transfer device according to an embodiment.
Figure 9:
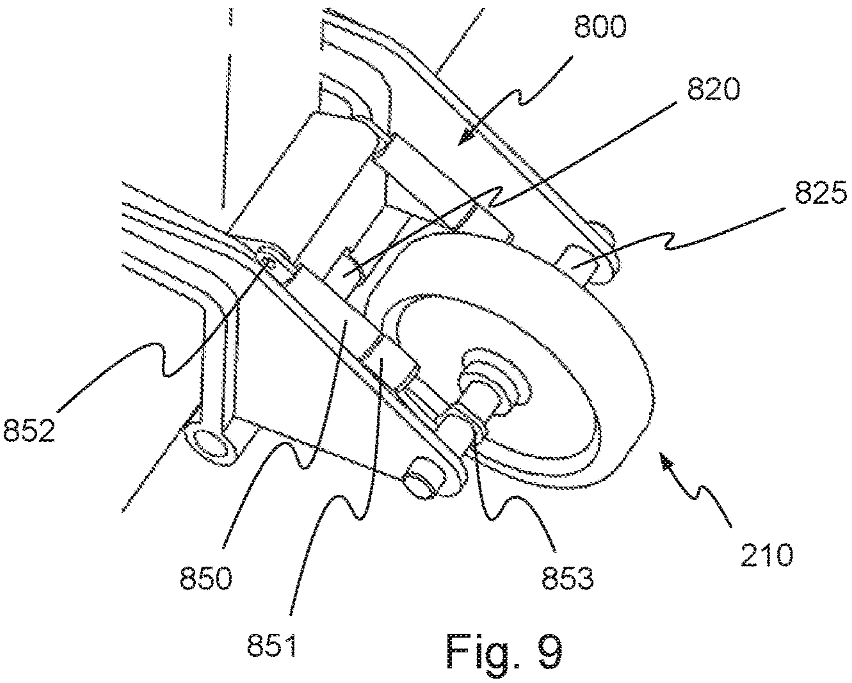
FIG. 9 is an isometric view of the supporting wheel and the mounting of supporting wheel according to an embodiment.

Referencing FIGS. 8 and 9, the patient transfer device 10 may comprise actuation means for actuating the supporting wheel 210.

The actuating means may be operatively connected to the supporting wheel 210 for actuating the supporting wheel 210 between the idle and operational position.

Operatively connected herein refers to either electronically connected and/or mechanically connected. An operative connection may comprise a direct connection but also connections comprising one or more additional devices, interfaces etc. The connection depends on whether the supporting wheel 210 is manually operable or automatically operated.

The actuation means allows for easier control of the position of the supporting wheel 210 and thereby allows for a patient transfer device 10 which is more user friendly to operate and manoeuvre.

The actuating means may comprise at least one actuating element 890. The actuating element 890 is operable by a user for actuating the supporting wheel 210 between the idle and operational position.

In one embodiment, the patient transfer device 10 may comprise a plurality of actuating elements 890. The actuating elements 890 may be distributed at different positions on the patient transfer device.

In one embodiment, the at least one actuating element 890 is operatively connected to the controller 500 (described with reference to FIG. 6). The actuating element 890 is configured to generate a signal to the controller 500. The controller 500 is operatively connected to the transmission motor (described with reference to FIGS. 4 and 5). The controller is operatively connected to the transmission motor for controlling the actuation of the supporting wheel 210. The controller 500 is configured to control the transmission motor to move the supporting wheel 210 between the idle and operational position based on the signal generated by the actuating element.

As the skilled person is aware, an actuating element may utilise a wide range of operating principles. In one embodiment, the at least one actuating element may be a hand operated element such as a switch, button or movable handle. In one embodiment, the at least one actuating element may be a voice operated element such as a voice controller comprising a microphone. The voice controller is operatively connected to the controller configured to control the transmission motor for controlling the actuation of the supporting (motorized) wheel 210.

Preferably, the at least one actuating element 890 is arranged to form a foot pedal, i.e. a switch operable by means of the feet of a user of the patient transfer device. This allows the user operating the patient transfer device to manoeuvre the patient transfer device with his or her arms while controlling the actuation with his or her feet, thus simplifying the operation of the patient transfer device.

Referencing FIG. 8, the actuating element 890 is arranged at the base 140 of the patient transfer device. Preferably the actuating element 890 forms a foot pedal arranged at said base 140.

Referencing FIG. 8, the actuating element 890 may comprise one or more or at least one actuating portions 891, 892, 893. The actuating portions are operable by a user for actuating the supporting wheel 210.

The protruding actuating portions 891, 892, 893 are arranged to be reached by a user during manoeuvring of the patient transfer device. The actuating portions 891, 892, 893 forms control points for the operation of the actuating element 890. In one embodiment, the actuating portions 891, 892, 893 forms flanges or ridges on the actuating element 890.

Again referencing FIG. 8, at least one actuation portion 891, 892 is arranged at a horizontal distance from the horizontal centreline HC in a direction substantially perpendicular to the horizontal centreline HC. Preferably, the actuation portion is arranged such that said actuation portion 891, 892 is accessible from a side of the patient transfer device extending parallel to the horizontal centreline HC. Thus, the user is provided with a manner of controlling the supporting wheel which is more accessible.

As depicted, a first actuation portion may be provided at a first position at a first horizontal distance relative the horizontal centreline HC and a second actuation portion may be provided at a second position at a second horizontal distance relative the horizontal centreline HC. The first position may be adjacent to a first corner of the rear side of the patient transfer device. The second position may be adjacent to a second corner of the rear side of the patient transfer device. The first and second actuation portion may be comprised on the same actuation element 890. In an alternative embodiment, the first actuation portion 891 may be comprised on a first actuation element and the second actuation portion may be comprised on a second actuation element.

Preferably, the actuation of above described actuation portion, e.g. the first and second actuation portion, causes actuation of the supporting wheel 210 to the idle position. This particularly advantageous due to enabling the user standing at the side of the lift, wanting to move it sideways, for example putting one foot on the actuation portion thus applying a force at approximately 45 degrees angle relative the ground which disengages the supporting wheel from the ground and at the same time moves the lift sideways with a reduced load of the users lower back as most of the force needed goes through the leg as opposed to the arms in traditional lift operations.

To further allow for such operation of the supporting wheel, the actuation portion 891, 892, e.g. the first and second actuation portion, may extend in a direction substantially perpendicular to the horizontal centerline and have an outer edge surface operably by the user, the outer surface being inclined relative a horizontal plane and facing outwardly from the horizontal centerline HC.

Again referencing FIG. 8, at least one actuation portion 893 is arranged proximal to the horizontal centerline HC. The at least one actuation portion 893 may be arranged such that it is accessible from a side of the patient transfer device extending substantially perpendicular to the horizontal centerline HC.

As depicted, a third actuation portion 893 may be provided at a position proximal to the horizontal centerline HC. The third actuation portion 893 is preferably provided at the rear side of the patient transfer device. The third actuation portion and first and second actuation portion may be comprised on the same actuation element 890. In an alternative embodiment, the third actuation portion 893 may be comprised on a separate actuation element from the first and second.

Preferably, the actuation of the above described actuation portion 893, e.g. third actuation portion, causes actuation of the supporting wheel 210 to the operational position.

Advantageously, the actuation portion 893 extends in a direction substantially parallel to the horizontal centreline HC and has an outer edge surface operable by the user, the outer surface being inclined relative a horizontal plane. The horizontal centreline HC extends through a plane formed by the outer edge surface.

In one embodiment, each actuation portion may be provided with a sensor for determining if the user is operating the actuation portion. The sensor generates an actuation signal to the controller 500 indicating if the is in contact with the actuation portion or not. The sensor may be any suitable sensor such as an ultrasonic proximity sensor, a surface acoustic wave sensor, a capacitive sensor, a resistive sensor, an electromechanical switch or combinations thereof. In a preferred embodiment of the patient transfer device, the sensor is a surface acoustic sensor, preferably in the form of an ultrasonic sensor where an ultrasonic transmitter is arranged towards the surface of the actuation portion and configured to measure the reflected sound which will change if e.g. a hand or foot of the user 20 is present at the at the actuation portion. The sensor is operatively connected to the controller 500, preferably to an activation module 530 of the controller 500. The controller 500 may be configured to actuate the supporting wheel 210 based on the actuation signal.

In a preferred embodiment, the first and/or second actuation portion may each be provided with a sensor configured to generate an actuation signal indicating if the user is operating the actuation portion. In case of the signal indicating that the user is operating the actuation portion, the controller causes actuation of the supporting wheel 210 to the idle position. The third actuation portion may be provided with a sensor configured to generate an actuation signal indicating if the user is operating the actuation portion. In case of the signal indicating that the user is operating the third actuation portion, the controller causes actuation of the supporting wheel 210 to the operational position. In case the actuation signal of each sensor of each actuation portion indicates that no user is operating the actuation portion, the supporting wheel 210 is kept in the operational position.

In one embodiment, the actuation portions may be formed by mechanical switches or mechanical levers operatively connected to the supporting wheel 210.

Advantageously, the actuating element 890 extends across the entire width of the base 140. The actuating element 890 may thus extend across the entire width of the patient transfer device. This allows for the actuating element to be accessible from multiple angles, further enabling easy manoeuvring of the supporting wheel.

Preferably, the actuating element 890 may be arranged at the rear end of the patient transfer device. The actuating element 890 may thus form a portion of said rear end. The actuating element 890 may thus be arranged substantially parallel to the handle of the patient transfer device. The actuating element 890 may be arranged to face an operator of the patient transfer device. The actuating element 890 may thus be arranged behind the support structure 200 relative the front direction F.

The mounting of the supporting wheel is further depicted in FIG. 9. The supporting wheel 210 may be mounted to the chassis of the patient transfer device by means of a biasing device 850. The biasing device 850 is arranged to provide a biasing force towards the ground when the supporting wheel is in the operational position.

The biasing device may comprise one or more springs 851 connecting the supporting wheel 210 to the chassis. A first end 852 of each spring may be pivotally connected to the chassis. A second, opposite, end 853 of each spring is pivotally connected to the supporting wheel 210. The second end 853 may be pivotally connected to the supporting wheel 210 via a supporting wheel shaft 825 on which the supporting wheel 210 is mounted.

As previously described with reference to FIGS. 4 and 5, the supporting wheel may be mounted to the chassis by means of a transmission. The transmission is not visible in FIG. 9. The transmission is controllable to cause a vertical motion of the supporting wheel 210 between the idle position and operational position.

The supporting wheel 210 is mounted to a mounting member 820. The supporting wheel 210 is mounted to the mounting member by means of the biasing device 850. The supporting wheel 210 is arranged at a distance from said mounting member in order to allow the supporting wheel 210 to move relative the mounting member 820. The mounting member 820 may form a part of the above described transmission. The mounting member 820 is rotatable for providing the vertical movement of the supporting wheel 210.

According to an aspect a patient transfer device and a method for controlling a patient transfer device according to the following clauses is provided.

1. A patient transfer device (10) comprising a chassis (100) having a plurality of wheels (110) and a vertically extending support structure (200), wherein said patient transfer device (10) further comprises one motorized wheel (210), wherein the chassis (100) comprises a base (140) arranged in a horizontal plane extending perpendicular to the support structure (200),
wherein a first and second front wheel of the plurality of wheels (110) are mounted to the base (140) at a horizontal distance from each other and a first and second back wheel of the plurality of wheels (110) are mounted to the base (140) at a horizontal distance from each other and the first and second front wheel, whereby said horizontal distances defines a support area (SA) in the horizontal plane, and whereby the motorized wheel (210) is mounted to the chassis (100) and arranged in a position in the horizontal plane disposed within the support area (SA).
2. The patient transfer device (10) according to clause 1, wherein the vertically extending support structure (200) extends along a vertical centreline (VC), wherein the vertical centreline (VC) intersects the horizontal plane in a support point (SP), wherein the first and second front wheel and the support point (SP) defines a support zone (SZ) in the horizontal plane within the support area (SA), whereby the motorized wheel (210) is arranged in a position in the horizontal plane disposed within the support zone (SZ).
3. The patient transfer device (10) according to clause 1 or 2, wherein the base (140) extends along a horizontal centreline (HC) and the motorized wheel (210) is aligned with said horizontal centreline (HC).
4. The patient transfer device (10) according to clause 2 or 3, wherein the motorized wheel (210) is arranged adjacent to the support point (SP).
5. The patient transfer device (10) according to any one of the preceding clauses, wherein the base (140) comprises a pair of horizontal bars (120) extending in the horizontal plane, each provided with one of the front wheels, whereby the motorized wheel (210) is arranged between said horizontal bars (120).
6. The patient transfer device (10) according to any one of the preceding clauses, wherein the vertically extending support structure (200) is provided with a patient support (220) for supporting the weight of a patient, said patient support (200) being provided with patient attachment means (225), wherein said patient attachment means (225) are arranged on the patient support (200) at a mounting point (MP), whereby a vertical support axis (SV) extends through said mounting point (MP) and intersects the horizontal plane in a point disposed in a portion of the horizontal plane extending between the motorized wheel (210) and the first and second front wheel.
7. The patient transfer device (10) according to clause 6, wherein the patient attachment means (225) is arranged to receive a patient sling to be worn by the patient.
8. The patient transfer device (10) according to any one of the preceding clauses, wherein the motorized wheel (210) is a non-swivel wheel.
9. The patient transfer device (10) according to any one of the preceding clauses, wherein the motorized wheel (210) is provided with a hub motor (213).
10. The patient transfer device (10) according to any one of clauses 1-8, wherein the motorized wheel (210) is mounted to the chassis (100) by means of a transmission (300).
11. The patient transfer device (10) according to clause 10, wherein the transmission (300) is controllable to cause a vertical motion of the motorized wheel (210) between an idle position, where the motorized wheel (210) is elevated from the ground, and an operational position, where the motorized wheel (210) is in driving contact with the ground.
12. The patient transfer device (10) according to clause 10 or 11, wherein the transmission (300) comprises a transmission motor (310) and a lead screw (320) driven by said motor (310).
13. The patient transfer device (10) according to any one of the preceding clauses, wherein said support structure (200) is provided with a handle (400) for manoeuvring the patient transfer device (10), and a patient support (220).
14. The patient transfer device (10) according to clause 13, wherein said handle (400) is provided with at least one sensor (410) for determining a grip of a user.
15. The patient transfer device (10) according to clause 13 or 14, wherein said handle (400) is provided with means (420) for determining user activation of the patient transfer device (10).
16. The patient transfer device (10) according to any of clauses 13-15, wherein said handle (400) is further provided with a force sensor (430) configured to measure the force applied to the patient transfer device (10) by a user.
17. The patient transfer device (10) according to any of the preceding clauses, further comprising a controller (500) connected to the motorized wheel (210) and being configured to control the operation of the motorized wheel (210).
18. The patient transfer device (10) according to clause 12 and 17, wherein the controller (500) is further connected to the transmission motor (310) and being configured to control the operation of the transmission motor (310).
19. The patient transfer device (10) according to clause 17 or 18, wherein the controller (500) is configured to determine control signals (525, 535) to the motorized wheel (210) and/or to the transmission motor (310) based on current operational properties of the patient transfer device (10).
20. The patient transfer device (10) according to clause 19, wherein the control signal (535) to the transmission motor (310) is determined based on the presence of a user gripping the patient transfer device (10).
21. The patient transfer device (10) according to clause 20, wherein the presence of a user gripping the patient transfer device (10) is determined by means of a sensor (410) using surface acoustic wave detection.
22. The patient transfer device (10) according to any one of clause 19 to 21, wherein the control signal (525) to the motorized wheel (210) is determined based on the force applied to the patient transfer device (10) by a user.
23. A controller (500) for a patient transfer device (10) according to any of clauses 1-22, said controller (500) being configured to determine a force applied to the associated patient transfer device (10) by a user (20), to determine a control signal (525) based on the determined force, and to transmit the control signal (525) to the motorized wheel (210).

24. The controller (500) according to clause 23, further configured to determine a current payload of the associated patient transfer device (10) as well as if a user (20) is gripping the patient transfer device (10), to determine a control signal (535) based on user grip, and to transmit the control signal (535) to a transmission motor (310) connected to the motorized wheel (210).

25. A method (700) for controlling a patient transfer device (10), comprising: determining initiation (710) of the patient transfer device (10), determining activation (720) of the patient transfer device (10), and controlling (730) operation of the patient transfer device (10) by arranging a motorized wheel (210) in an operational position, where the motorized wheel (210) is in driving contact with the ground (G), and by controlling a speed of the motorized wheel (210) based on a determined force applied by a user (20) to the patient transfer device (10).

26. The method (700) according to clause 25, wherein determining initiation (710) of the patient transfer device comprises determining (710) that a current payload is above a threshold weight value, and/or determining (710) that a voltage level of an associated battery (600) is above a threshold value and/or determining that a tilt sensor (230) is under a threshold tilt angle.

27. The method according to clause 25 or 26, wherein determining activation (720) of the patient transfer device comprises determining (720) that a user (20) is gripping the patient transfer device (20), and that the user has manually requested activation while gripping the patient transfer device (10).

28. The method according to any of clauses 25 to 27, wherein the controlling of the speed of the motorized wheel (210) based on the determined force applied by a user (20) to the patient transfer device (10) is such that the user (20) perceives a weight of the payload to be that of a comfort weight.

29. The method according to clause 27 or 28, wherein the determining of a grip of a user (20) is performed by means of a sensor (410) using surface acoustic wave detection.

30. A patient transfer device (10) comprising a chassis (100) having a plurality of wheels (110) and a vertically extending support structure (200), the patient transfer device (10) further comprising a base (140), wherein the patient transfer device (10) further comprises at least one motorized wheel (210) and is provided with a handle (400) for manoeuvring of the patient transfer device (10), the handle (400) being provided with at least one sensor (410) for determining a grip of a user, wherein the patient transfer device (10) further comprises a controller (500) operatively connected to the at least one motorized wheel (210) and the at least one sensor (410), whereby the controller (500) is configured to control the operation of the at least one motorized wheel (210) in response to input from the at least one sensor (410).

31. The patient transfer device (10) according to clause 30, wherein the patient transfer device is a patient transfer device according to any one of clauses 1 to 22.

The invention claimed is:

1. A patient transfer device, comprising:

a chassis including a base arranged in a horizontal plane, and a first front wheel and a second front wheel;

a support structure connected to the chassis; and a transmission assembly including a transmission motor, a supporting wheel, and a biasing element, wherein the support structure extends from the chassis in a vertical direction, wherein the transmission assembly is mounted to the chassis and the supporting wheel is configured to pivot horizontally relative to the chassis, wherein the transmission assembly is configured to reversibly move the supporting wheel vertically between an idle position, in which the supporting wheel is elevated away from the ground, and an operational position, in which the supporting wheel contacts the ground with a contact force, and wherein, in the operational position, the biasing element is configured to apply a biasing force to the supporting wheel to increase the contact force between the supporting wheel and the ground.

2. The patient transfer device according to claim 1, wherein, in the operational position, the transmission motor is configured to adjust a vertical position of the supporting wheel to maintain contact between the supporting wheel and the ground.

3. The patient transfer device according to claim 2, wherein increasing a current to the transmission motor adjusts the vertical position of the supporting wheel in a first vertical direction and decreasing the current to the transmission motor adjusts the vertical position of the supporting wheel in a second vertical direction.

4. The patient transfer device according to claim 2, further comprising a controller, wherein the controller is configured to increase the current to the transmission motor and decrease the current to the transmission motor.

5. The patient transfer device according to claim 2, further comprising a controller configured to send a control signal to the transmission motor for adjusting the vertical position of the supporting wheel.

6. The patient transfer device according to claim 5, wherein the control signal to the transmission motor is determined based on a force applied to the patient transfer device by a user.

7. The patient transfer device according to claim 1, wherein, in the operational position, the biasing element is further configured to dampen vibrations arising from the supporting wheel.

8. The patient transfer device according to claim 1, wherein the transmission assembly further includes a linkage, wherein the supporting wheel is connected to the transmission motor by the linkage, and wherein the supporting wheel is horizontally pivotable relative to the chassis via the linkage.

9. The patient transfer device according to claim 8, wherein the transmission motor is configured to horizontally pivot the supporting wheel relative to the chassis.

10. The patient transfer device according to claim 1, wherein the supporting wheel is vertically movable relative to the chassis via the linkage.

11. The patient transfer device according to claim 1, wherein the biasing element is connected at a first end to the chassis and is connected at a second end to the supporting wheel.

12. The patient transfer device according to claim 1, wherein the biasing element is pivotally connected at a first end to the chassis and is pivotally connected at a second end to the supporting wheel.

13. The patient transfer device according to claim 1, wherein the supporting wheel is motorized.

14. The patient transfer device according to claim 13, further comprising a controller configured to:

determine a force applied to the patient transfer device by a user, determine a control signal based on the determined force, and transmit the control signal to the supporting wheel.

15. The patient transfer device according to claim 1, wherein the supporting wheel is non-swiveling.

16. The patient transfer device according to claim 1, wherein the support structure is provided with a patient support for supporting the weight of a patient, said patient support being provided with patient attachment means, wherein said patient attachment means are arranged on the patient support at a mounting point (MP), whereby a vertical support axis (SV) extends through said mounting point (MP) and intersects the horizontal plane in a point disposed in a portion of the horizontal plane extending between the supporting wheel and the first front wheel and the second front wheel, and wherein the patient attachment means is arranged to receive a patient sling to be worn by the patient.

* * * * *